(12) United States Patent
Koda et al.

(10) Patent No.: US 12,466,219 B2
(45) Date of Patent: Nov. 11, 2025

(54) PNEUMATIC TIRE

(71) Applicant: The Yokohama Rubber Co., LTD., Tokyo (JP)

(72) Inventors: Hiraku Koda, Hiratsuka (JP); Jun Matsuda, Hiratsuka (JP); Atsushi Tanno, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 469 days.

(21) Appl. No.: 16/769,570

(22) PCT Filed: Nov. 21, 2018

(86) PCT No.: PCT/JP2018/043082
§ 371 (c)(1),
(2) Date: Jun. 3, 2020

(87) PCT Pub. No.: WO2019/111719
PCT Pub. Date: Jun. 13, 2019

(65) Prior Publication Data
US 2020/0331302 A1 Oct. 22, 2020

(30) Foreign Application Priority Data
Dec. 4, 2017 (JP) .................................. 2017-232961

(51) Int. Cl.
*B60C 15/00* (2006.01)
*B60C 15/024* (2006.01)
(Continued)

(52) U.S. Cl.
CPC .......... *B60C 15/04* (2013.01); *B60C 15/0045* (2013.01); *B60C 15/0054* (2013.01);
(Continued)

(58) Field of Classification Search
CPC ............ B60C 15/0036; B60C 15/0045; B60C 15/0054; B60C 2015/009; B60C 15/00; B60C 15/024; B60C 15/04
See application file for complete search history.

(56) References Cited

U.S. PATENT DOCUMENTS 5,524,688 A * 6/1996 Trares ................. B60C 15/0036
152/554
2001/0050128 A1 12/2001 Ohara et al.
(Continued)

FOREIGN PATENT DOCUMENTS

DE 11 2018 006 148 T5 9/2020
EP 128852 A * 12/1984 ............. B60C 13/00
(Continued)

OTHER PUBLICATIONS

Machine Translation: JP-2002301915-A, Tanaka, Masatoshi, (Year: 2021).*

(Continued)

*Primary Examiner* — Kendra Ly
(74) *Attorney, Agent, or Firm* — Thorpe North & Western

(57) ABSTRACT

In a pneumatic tire, a turned back portion of a carcass layer contacts a body portion of the carcass layer in a cross-sectional view in a tire meridian direction to form a closed region surrounding bead cores. A rubber occupancy ratio in the closed region is in a range of 15% or less. The bead cores have a predetermined wire arrangement structure formed by arranging wire cross sections of bead wires in the cross-sectional view in the tire meridian direction. Additionally, a self-contact height (CH) of the carcass layer and a circumferential length (L) of the wire arrangement have a relationship $1.0 \leq CH/L \leq 10.0$.

16 Claims, 16 Drawing Sheets

(51) Int. Cl.
  *B60C 15/04* (2006.01)
  *B60C 13/00* (2006.01)
  *B60C 15/06* (2006.01)

(52) U.S. Cl.
  CPC ...... *B60C 15/024* (2013.01); *B60C 2013/007* (2013.01); *B60C 2015/009* (2013.01); *B60C 2015/046* (2013.01); *B60C 2015/048* (2013.01); *B60C 2015/061* (2013.01)

(56) References Cited

U.S. PATENT DOCUMENTS

| | | | |
|---|---|---|---|
| 2004/0089392 A1* | 5/2004 | Yukawa | B60C 9/2204 |
| | | | 152/526 |
| 2013/0240107 A1* | 9/2013 | Ebiko | B60C 15/0603 |
| | | | 152/541 |
| 2014/0326386 A1 | 11/2014 | Sato | |
| 2015/0020944 A1 | 1/2015 | Till et al. | |
| 2015/0328938 A1 | 11/2015 | Isaka | |
| 2018/0134097 A1* | 5/2018 | Isaka | B60C 15/06 |
| 2021/0221183 A1 | 7/2021 | Tanno et al. | |

FOREIGN PATENT DOCUMENTS

| | | | | |
|---|---|---|---|---|
| EP | 0554108 A1 * | 8/1993 | ............ | B60C 11/00 |
| JP | S59124415 A * | 7/1984 | | |
| JP | H02124303 A * | 5/1990 | | |
| JP | H07-032824 | 2/1995 | | |
| JP | H11-321250 | 11/1999 | | |
| JP | 2002127712 A * | 5/2002 | ......... | B60C 15/0045 |
| JP | 2002-301915 | 10/2002 | | |
| JP | 2002301915 A * | 10/2002 | ............ | D07B 1/062 |
| JP | 2007045361 A * | 2/2007 | | |
| JP | 2008068831 A * | 3/2008 | | |
| JP | 2008-149778 | 7/2008 | | |
| JP | 2009274477 A * | 11/2009 | | |
| JP | 2011037408 A * | 2/2011 | | |
| JP | 2012-162204 | 8/2012 | | |
| JP | 2013078983 A * | 5/2013 | | |
| JP | 2014-218096 | 11/2014 | | |
| JP | 2015-020741 | 2/2015 | | |
| JP | 2015-189253 | 11/2015 | | |
| JP | 2015-217824 | 12/2015 | | |
| WO | WO-2019105620 A1 * | 6/2019 | | |

OTHER PUBLICATIONS

Machine Translation: JP-2013078983-A, Sasaki, Keiyuki, (Year: 2021).*
Machine Translation: JP-2009274477-A, Nemoto, Masayuki, (Year: 2021).*
Machine Translation: JP-2007045361-A, Ota, Hiromi, (Year: 2021).*
Machine Translation: JP-2008068831-A, Takahashi, Hideaki, (Year: 2021).*
Translation: JP-2011037408-A, Kawabata K, (Year: 2022).*
Machine Translation: JP-2002127712-A, Kusumoto T, (Year: 2022).*
Machine translation: WO-2019105620-A1, Plueckers M, (Year: 2025).*
Machine translation: JP-2009274477-A, Nemoto M, (Year: 2025).*
Machine translation: JP-H02124303-A, Iwamura Kazumitsu, (Year: 2025).*
Machine translation: JP-S59124415-A, Tsuyuki Kunio, (Year: 2025).*
International Search Report for International Application No. PCT/JP2018/043082 dated Feb. 26, 2019, 4 pages, Japan.

* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|
| BEAD FILLER | NO | NO | NO | NO | NO | NO | NO | NO | NO | NO |
| RUBBER OCCUPANCY RATIO IN CLOSED REGION X (%) | 2.0 | 2.0 | 2.0 | 2.0 | 2.0 | 2.0 | 2.0 | 2.0 | 2.0 | 2.0 |
| WIRE ARRANGEMENT STRUCTURE | FIG. 16 | FIG. 16 | FIG. 16 | FIG. 16 | FIG. 16 | FIG. 16 | FIG. 16 | FIG. 16 | FIG. 12 | FIG. 4 |
| φ (mm) | 1.2 | 1.2 | 1.2 | 1.2 | 1.2 | 1.2 | 1.2 | 1.2 | 1.2 | 1.2 |
| L (mm) | 20.0 | 20.0 | 20.0 | 20.0 | 20.0 | 20.0 | 20.0 | 20.0 | 22.6 | 24.6 |
| CH (mm) | 5.8 | 65 | 20 | 90 | 65 | 65 | 65 | 65 | 65 | 65 |
| PH (mm) | 14 | 70 | 30 | 100 | 70 | 70 | 70 | 70 | 70 | 70 |
| SH (mm) | 110 | 110 | 110 | 110 | 110 | 110 | 110 | 110 | 110 | 110 |
| CH/L | 0.29 | 3.25 | 1.00 | 4.50 | 3.25 | 3.25 | 3.25 | 3.25 | 2.88 | 2.64 |
| L/SH | 0.18 | 0.18 | 0.18 | 0.18 | 0.18 | 0.18 | 0.18 | 0.18 | 0.18 | 0.18 |
| SH − CH (mm) | 104 | 45 | 90 | 20 | 45 | 45 | 45 | 45 | 45 | 45 |
| CH/PH | 0.41 | 0.93 | 0.67 | 0.90 | 0.93 | 0.93 | 0.93 | 0.93 | 0.93 | 0.93 |
| Wo (mm) | 6.0 | 5.0 | 5.0 | 5.0 | 2.0 | 8.0 | 5.0 | 5.0 | 5.0 | 5.0 |
| Wi (mm) | 2.0 | 2.0 | 2.0 | 2.0 | 1.0 | 2.0 | 2.0 | 2.0 | 2.0 | 2.0 |
| Wo + Wi | 8.0 | 7.0 | 7.0 | 7.0 | 3.0 | 10.0 | 7.0 | 7.0 | 7.0 | 7.0 |
| Wo/Wi | 3.0 | 2.5 | 2.5 | 2.5 | 2.0 | 4.0 | 2.5 | 2.5 | 2.5 | 2.5 |
| K1 (mm) | 9.0 | 6.8 | 6.8 | 6.8 | 6.8 | 6.8 | 5.0 | 5.0 | 5.0 | 5.0 |
| K2 (mm) | 4.5 | 3.5 | 3.5 | 3.5 | 3.5 | 3.5 | 3.5 | 2.0 | 2.0 | 2.0 |
| K2/Wo | 0.75 | 0.70 | 0.70 | 0.70 | 1.75 | 0.44 | 0.70 | 0.40 | 0.40 | 0.40 |
| TIRE MASS | 100 | 97 | 96 | 98 | 96 | 98 | 96 | 95 | 96 | 97 |
| RIM FITTABILITY | 100 | 104 | 103 | 105 | 103 | 105 | 104 | 104 | 106 | 108 |

FIG. 15

CONVENTIONAL EXAMPLE

PNEUMATIC TIRE

TECHNICAL FIELD

The technology relates to a pneumatic tire and particularly relates to a pneumatic tire that can improve rim fittability of the tire while a weight of the tire is reduced.

BACKGROUND ART

In recent years, for weight reduction of a tire, weight reduction of bead portions has been advanced. As a conventional pneumatic tire described in Japan Unexamined Patent Publication No. 2008-149778 has been known in which bead fillers are omitted to reduce a weight of the tire.

However, in the conventional pneumatic tire described above, deterioration of rim fittability of the tire due to the omission of the bead fillers is concerned.

SUMMARY

The technology provides a pneumatic tire that can improve rim fittability of the tire while a weight of the tire is reduced.

In order to achieve the object, a pneumatic tire according to an embodiment of the technology includes bead cores, a carcass layer, and a rim cushion rubber. The bead cores are formed by annularly and multiply winding one or a plurality of bead wires. The carcass layer is formed of a carcass ply of a single layer or a plurality of layers. The carcass layer is turned back so as to wrap the bead cores and extended between the bead cores. The rim cushion rubber is disposed along a turned back portion of the carcass layer to constitute a rim fitting surface of a bead portion. The turned back portion of the carcass layer contacts a body portion of the carcass layer in a cross-sectional view in a tire meridian direction to form a closed region surrounding the bead cores. A rubber occupancy ratio in the closed region is in a range of 15% or less. The bead cores have a predetermined wire arrangement structure formed by arranging wire cross sections of the bead wires in the cross-sectional view in the tire meridian direction. A self-contact height CH of the carcass layer and a circumferential length L of the wire arrangement structure have a relationship $1.0 \leq CH/L \leq 10.0$.

In the pneumatic tire according to an embodiment of the technology, (1) the rubber occupancy ratio in the closed region surrounded by the body portion and the turned back portion of the carcass layer, that is, a rubber volume around the bead cores, is set to be considerably low. This has an advantage that bead fillers are omitted and a weight of the tire is reduced. Additionally, this has an advantage that (2) the ratio CH/L makes the self-contact height CH of the carcass layer appropriate. That is, the lower limit ensures rigidity of the bead portion, and ensures rim fittability of the tire. In addition, the upper limit suppresses an increase in tire weight due to an excessive amount of the turned back portion.

BRIEF DESCRIPTION OF DRAWINGS

FIG. 15 is a table showing results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
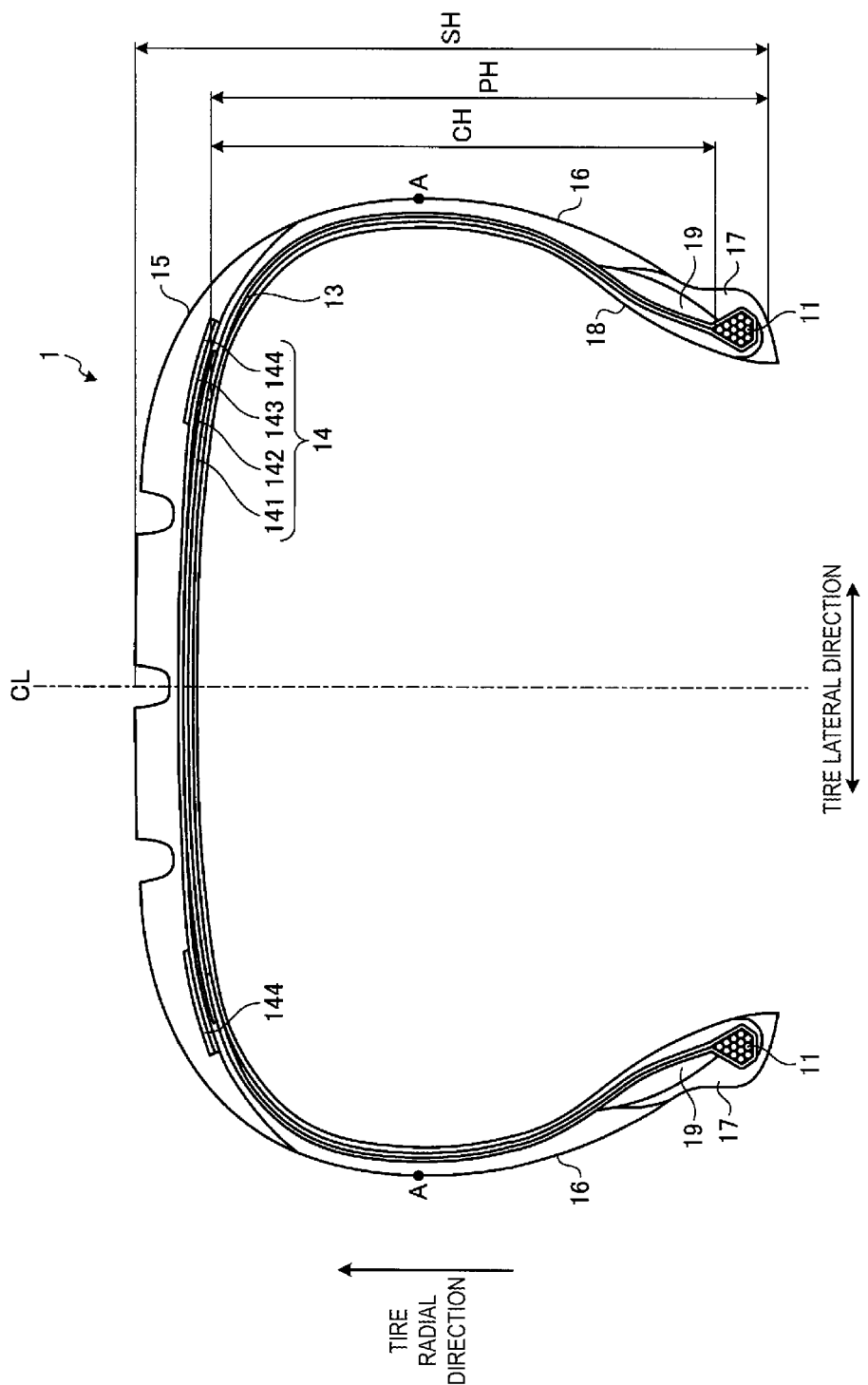
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

A pneumatic tire 1 has an annular structure with the tire rotation axis as its center and includes a pair of bead cores 11, 11, a carcass layer 13, a belt layer 14, a tread rubber 15, a pair of sidewall rubbers 16, 16, a pair of rim cushion rubbers 17, 17, and an innerliner 18 (see FIG. 1).

The pair of bead cores 11, 11 are formed by annularly and multiply winding one or a plurality of bead wires made of steel. The pair of bead cores 11, 11 are embedded in bead portions to constitute cores of the right and left bead portions.

The carcass layer 13 has a single layer structure formed of one carcass ply or a multilayer structure formed by layering a plurality of carcass plies, and extends between the right and left bead cores 11, 11 in a toroidal shape, forming the framework of the tire. Additionally, both end portions of the carcass layer 13 are turned back outwardly in the tire lateral direction so as to wrap around the bead cores 11 and fixed. The carcass ply (plies) of the carcass layer 13 is made by performing a rolling process on a plurality of coating rubber-covered carcass cords made of steel or an organic fiber material (e.g. aramid, nylon, polyester, and rayon). The carcass ply (plies) has a carcass angle (defined as an inclination angle of a longitudinal direction of the carcass cords with respect to the tire circumferential direction), as an absolute value, ranging from 80 degrees or greater to 90 degrees or less, and preferably less than 90 degrees (namely, 89 degrees or less). Although the configuration of FIG. 1 has the single layer structure in which the carcass layer 13 is formed of the single carcass ply, no such limitation is intended, and the carcass layer 13 may have a multilayer structure formed by layering the plurality of carcass plies.

The belt layer 14 is formed by layering a pair of cross belts 141, 142, a belt cover 143, and a pair of belt edge covers 144, and arranged to be wound around the periphery of the carcass layer 13. The pair of cross belts 141, 142 are made by performing a rolling process on a plurality of coating rubber-covered belt cords made of steel or an organic fiber material. The cross belts 141, 142 have a belt angle, as an absolute value, ranging from 20 degrees or greater to 55 degrees or less. Note that the belt angles of the cross belts 141, 142 are not limited to the range described above, and any angle can be set. Furthermore, the pair of cross belts 141, 142 have belt angles (defined as inclination angles of the longitudinal direction of the belt cords with respect to the tire circumferential direction) of mutually different signs, and the cross belts 141, 142 are layered so that the longitudinal directions of the belt cords intersect with one another (so-called crossply structure). The belt cover 143 and the pair of belt edge covers 144 are made by coating belt cover cords made of steel or an organic fiber material with a coating rubber and have belt angles, as an absolute value, from 0 degrees or greater to 10 degrees or less. Further, the belt cover 143 and the pair of belt edge covers 144 are, for example, a strip material formed by coating one or a plurality of belt cover cords with a coating rubber and winding the strip material spirally around the outer circumferential surfaces of the cross belts 141, 142 multiple times in the tire circumferential direction. Note that the belt cover 143 and the pair of belt edge covers 144 may be omitted (not illustrated).

The tread rubber 15 is disposed outward of the carcass layer 13 and the belt layer 14 in the tire radial direction and constitutes a tread portion of the tire. The pair of sidewall rubbers 16, 16 are disposed outward of the carcass layer 13 in the tire lateral direction and constitute right and left sidewall portions. The pair of respective rim cushion rubbers 17, 17 are disposed inward of the right and left bead cores 11, 11 and the turned back portions of the carcass layer 13 in the tire radial direction to constitute rim fitting surfaces of the bead portions.

The innerliner 18 is an air penetration preventing layer that is disposed on the tire cavity surface and covers the carcass layer 13. The innerliner 18 also suppresses oxidation caused by exposure of the carcass layer 13 and prevents air inside the tire from leaking. In addition, the innerliner 18 is constituted by, for example, a rubber composition with butyl rubber as a main component, thermoplastic resin, thermoplastic elastomer composition made by blending an elastomer component with a thermoplastic resin, and the like. The innerliner 18 is adhered to the carcass layer 13 via a tie rubber (not illustrated).

Bead Filler-Less Structure

Figure 2:
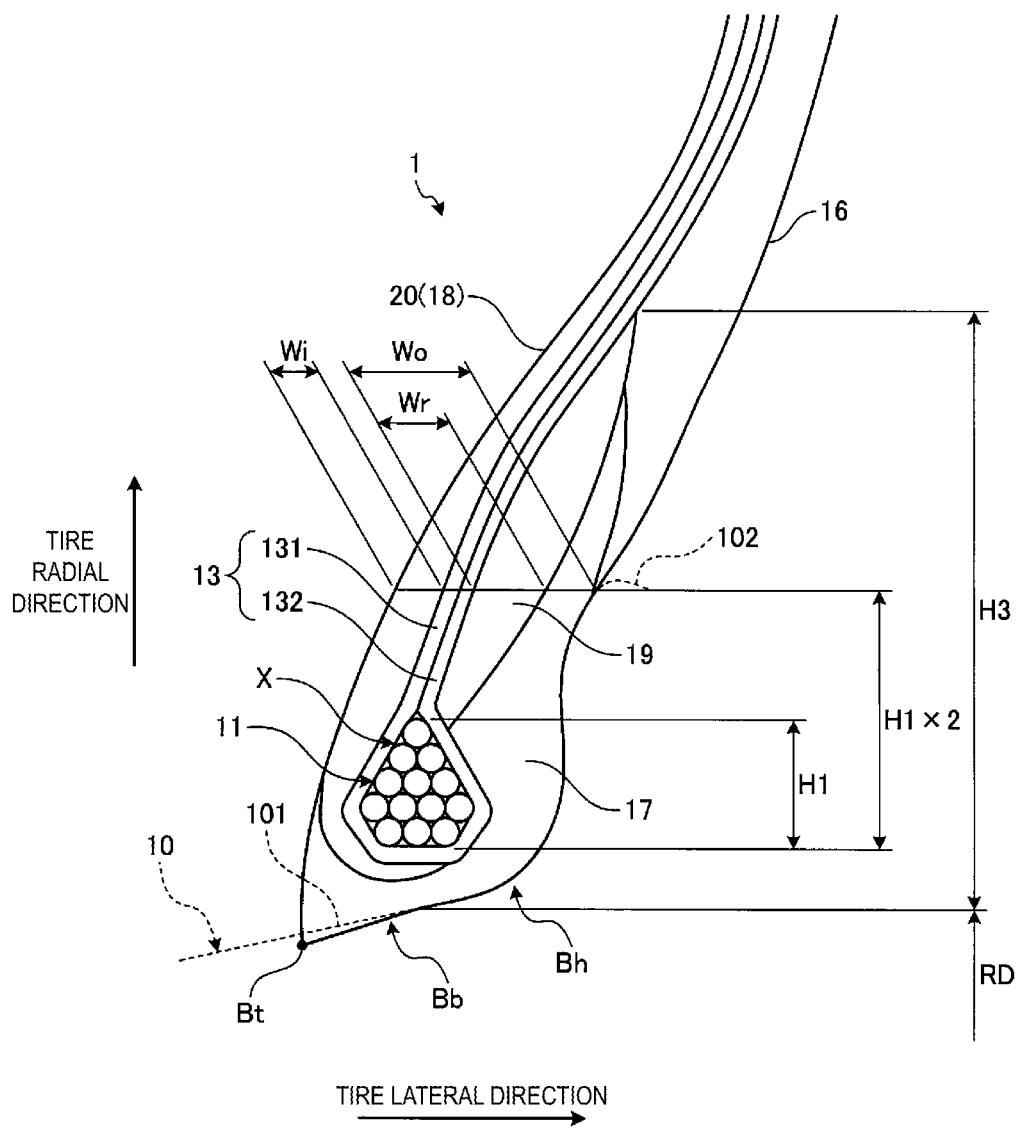
FIG. 2 is a cross-sectional view illustrating a bead portion of the pneumatic tire illustrated in FIG. 1.

FIG. 2 is a cross-sectional view illustrating the bead portion of the pneumatic tire illustrated in FIG. 1. The same drawing illustrates a cross-sectional view in the tire meridian direction of the bead portion in a state before mounting of the tire on a rim.

As illustrated in FIG. 2, the carcass layer 13 is turned back outwardly in the tire lateral direction so as to wrap around the bead cores 11 and fixed. At this time, a closed region X surrounding the bead cores 11 is formed by contact of a turned back portion 132 of the carcass layer 13 with a body portion 131. Also, the closed region X continuous across the entire circumference of the tire forms an annular closed space surrounding the bead cores 11.

The closed region X is defined as a region surrounded by the carcass ply of the carcass layer 13 in a cross-sectional view in the tire meridian direction. Specifically, the area surrounded by the surface of the coat rubber of the carcass ply is defined as the closed region X.

Also, in the configuration of FIG. 2, the carcass layer 13 is formed of the single-layer carcass ply, and the closed region X is formed by self-contact of the carcass ply. On the other hand, in a configuration in which the carcass layer 13 is formed of the plurality of layered carcass plies (not illustrated), the closed region X can be formed by mutual contact of the different carcass plies. For example, the following configuration (not illustrated) is assumed. The carcass layer 13 has a two-layer structure formed by layering first and second carcass plies, a turned back portion of the first carcass ply terminates in the middle of a radial height H1 (see FIG. 2) of the bead cores 11 without in contact with the body portion, and a turned back portion of the second carcass ply extends to radially outward of the bead cores 11 and is in contact with the body portion of the first carcass ply.

At this time, a rubber occupancy ratio in the closed region X is preferably in the range of 15% or less, more preferably in the range of 10% or less, and further preferably in the range of 5% or less. Accordingly, the rubber occupancy ratio in the closed region X surrounded by the body portion 131 and the turned back portion 132 of the carcass layer 13, that is, a rubber volume around the bead cores 11, is set to be considerably low. Thus, a purpose of reducing the weight of the tire brought by omission of bead fillers is achieved. Note that the lower limit of the rubber occupancy ratio is not particularly limited but is preferably 0.1% or greater.

The rubber occupancy ratio is calculated as a proportion (%) of a cross-sectional area of the rubber materials in the closed region X to the overall cross-sectional area of the closed region X in the cross-sectional view in the tire meridian direction.

For example, in the configuration of FIG. 2, the turned back portion 132 of the carcass layer 13 is turned back without including a bead filler in the closed region X and in contact with the body portion 131. Also, the carcass ply of the carcass layer 13 is wound up along the outer circumferential surfaces of the bead cores 11. Thus, only constituent members of the bead cores 11 are present in the closed area X. The constituent members of the bead cores 11 include bead wires 111, the insulation rubbers, bead covers, and wrapping threads.

Note that the bead filler is a reinforcing rubber disposed so as to fill the triangular gap between the bead cores, the body portion, and the turned back portion of the carcass layer, and is disposed to increase rigidity of the bead portion. The bead filler generally has a triangular cross section and has a rubber hardness from 65 or greater to 99 or less.

The rubber hardness is measured in accordance with JIS (Japanese Industrial Standard) K 6253.

Self-Contact Height of Carcass Layer

In the above-described configuration in which the bead filler is omitted, as illustrated in FIG. 2, the turned back portion 132 of the carcass layer 13 is in surface contact with the body portion 131 of the carcass layer 13 and fixed. This increases the rigidity of the bead portion and improves durability of the bead portion.

At this time, the self-contact height CH of the carcass layer 13 and a circumferential length L (dimension symbol is omitted in the drawing) of a wire arrangement structure of the bead cores 11 preferably have a relationship $1.0 \leq CH/L \leq 10.0$ and more preferably have a relationship $2.2 \leq CH/L \leq 7.0$. Thus, the self-contact height CH of the carcass layer 13 is made appropriate. In other words, the lower limit causes the turned back portion 132 to stably contact the body portion 131, thus ensuring the rigidity of the bead portion and ensuring rim fittability of the tire and the durability of the bead portion. In addition, the upper limit suppresses an increase in tire weight due to the excessive amount of the turned back portion 132. However, since the amount of increase in the tire weight due to the amount of increase in the self-contact height CH is much smaller than the amount of reduction in the tire weight due to the omission of bead fillers described above, the weight reduction of the tire is appropriately achieved even in the configuration described above.

The self-contact height CH of the carcass layer is measured as the maximum height of a contact portion between the body portion and the turned back portion of the carcass layer in the tire radial direction.

The circumferential length L of the bead cores is measured as follows. First, the wire arrangement structure of the bead cores in the cross-sectional view in the tire meridian direction is identified. Specifically, the wire arrangement structure of the bead cores at the time of the components alone before mounting on a green tire (that is, before the bead cores lose their shapes in a tire vulcanization molding process) is identified. Next, external tangents of the bead wires constituting the outer circumferential surfaces of the bead cores are connected, and a polygon (see FIG. 4 described later) surrounding the wire arrangement structure is drawn. The circumferential length of the polygon is measured as the circumferential length L of the bead cores.

Additionally, the circumferential length L of the wire arrangement structure of the bead cores 11 and a tire cross-sectional height SH preferably have a relationship $0.12 \leq L/SH \leq 1.00$, and more preferably have a relationship $0.14 \leq L/SH \leq 0.50$. Thus, the circumferential length L of the bead cores 11 is made appropriate. In other words, as the tire cross-sectional height SH becomes large, the rim fittability of the tire tends to be deteriorated. That is, the lower limit ensures the circumferential length L of the bead cores 11, and ensures the rim fittability of the tire. In addition, the upper limit suppresses the increase in tire weight due to the excessive amount of the bead cores 11.

The tire cross-sectional height SH is a distance half of the difference between the tire outer diameter and the rim diameter and measured when the tire is mounted on the specified rim, inflated to the specified internal pressure, and in an unloaded state.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

Additionally, the tire cross-sectional height SH and the self-contact height CH of the carcass layer 13 preferably have a relationship $2.4 \text{ mm} \leq SH-CH \leq 120 \text{ mm}$, and more preferably have a relationship $2.6 \text{ mm} \leq SH-CH \leq 99 \text{ mm}$. Accordingly, a difference between the tire cross-sectional height SH and the self-contact height CH of the carcass layer 13 is made appropriate.

Additionally, the self-contact height CH and a turned-up height PH of the carcass layer 13 and a tire aspect ratio HF preferably have a relationship $0.60 \times (HF/100) \leq CH/PH \leq 0.98$, more preferably have a relationship $0.70 \times (HF/100) \leq CH/PH \leq 0.96$, and further preferably have a relationship $0.80 \times (HF/100) \leq CH/PH \leq 0.95$. Thus, the ratio CH/PH is made appropriate. In other words, as the tire aspect ratio HF becomes large, the rim fittability of the tire tends to be deteriorated. Therefore, the lower limit ensures the ratio of the self-contact height CH to the turned-up height PH of the carcass layer 13, and ensures the rim fittability of the tire. In addition, the upper limit suppresses an increase in tire weight due to the excessive amount of the turned back portion 132.

The tire aspect ratio is calculated as a ratio (%) between the tire cross-sectional height and a tire cross-sectional width.

The cross-sectional height is measured as a linear distance between sidewalls (excluding, for example, patterns and alphanumerics on the tire side surfaces) when the tire is mounted on a specified rim, inflated to the specified internal pressure, and in an unloaded state.

The turned-up height PH of the carcass layer is measured as a distance in the tire radial direction from a measurement point of a rim diameter to a turned up end portion of the carcass layer when the tire is mounted on a specified rim, inflated to the specified internal pressure, and in an unloaded state.

Additionally, an actual length La2 (dimension symbol is omitted in the drawing) of the contact portion between the body portion 131 and the turned back portion 132 of the carcass layer 13 preferably has a relationship $1.0 \leq La2/La1 \leq 8.0$ to a circumferential length La1 (dimension symbol is omitted in the drawing) of the closed region X, and more preferably has a relationship $2.1 \leq La2/La1 \leq 6.0$. Thus, the actual length La2 of the self-contact portion of the carcass layer 13 is made appropriate. That is, the lower limit properly ensures spring characteristics of the carcass layer 13, ensures steering stability on dry road surfaces, and ensures the durability of the bead portion. In addition, the upper limit suppresses an increase in tire weight due to the excessive amount of the turned back portion 132.

The circumferential length La1 of the closed region X is measured as a periphery length of the surface of the carcass ply constituting the boundary line of the closed region X in the cross-sectional view in the tire meridian direction.

The actual length La2 of the contact portion is measured as a periphery length at the self-contact portion between the body portion and the turned back portion of the carcass layer in the cross-sectional view in the tire meridian direction.

For example, in the configuration of FIG. 1, the turned back portion 132 of the carcass layer 13 extends outward in the tire radial direction beyond a tire maximum width position A. Additionally, an end portion (reference sign is omitted in the drawing) of the turned back portion 132 is held by being sandwiched between the body portion 131 of the carcass layer 13 and the innermost layer of the belt layer 14 (the cross belt 141 on the inner diameter side in FIG. 1). However, no such limitation is intended, and the turned back portion 132 of the carcass layer 13 may be positioned in the middle of the tire side portion (not illustrated). In this case, the end portion of the turned back portion 132 of the carcass layer 13 preferably contacts the body portion 131 of the carcass layer 13. In such a configuration, stress concentration at the end portion of the turned back portion 132 is reduced compared to a configuration in which the end portion of the turned back portion 132 is spaced apart from the body portion 131 (not illustrated). Accordingly, separation of the peripheral rubber starting from the end portion of the turned back portion 132 is suppressed.

Additionally, in the configuration of FIG. 1, as illustrated in FIG. 2, bead fillers are omitted, and the rubber occupancy ratio of the closed region X surrounding the bead cores 11 is set to be considerably small. Thus, the turned back portion 132 of the carcass layer 13 is in contact with the body portion 131 of the carcass layer 13 from the vicinity of the bead cores 11. Accordingly, the self-contact height CH of the carcass layer 13 is increased.

Tire Gauge on Top of Cores

Additionally, in FIG. 2, a tire gauge Wo outward in the tire lateral direction and a tire gauge Wi inward in the tire lateral direction of the carcass layer 13 at radial positions twice the radial height H1 of the bead cores 11 preferably meet a condition $3.0 \text{ mm} \leq Wo+Wi \leq 20 \text{ mm}$, more preferably meet a condition $4.0 \text{ mm} \leq Wo+Wi \leq 18 \text{ mm}$, and further preferably meet a condition $2.0 \text{ mm} \leq Wo+Wi \leq 8 \text{ mm}$. Thus, the tire gauges inside and outside the carcass layer 13 in the region outward of the bead cores 11 in the radial direction are made appropriate. That is, the rigidity of the region has a large influence on the rim fittability of the tire. Accordingly, the lower limit ensures the tire gauges in the region and ensures the rim fittability of the tire. In addition, the upper limit suppresses an increase in tire weight due to the excessive amount of the tire gauge.

The radial height H1 of the bead cores is measured as the maximum height in the tire radial direction from the innermost layer in the wire arrangement structure of the bead cores in the tire radial direction and the inner end in the tire radial direction of the wire cross section outermost in the tire lateral direction to an outermost layer in the tire radial direction and an outer end in the tire radial direction of the wire cross section outermost in the tire lateral direction.

The tire gauges Wo, Wi are measured as a sum of gauges in the tire lateral direction of the tire members at the radial positions twice the radial height H1 of the bead cores. In addition to the rubber members, such as the sidewall rubber 16 and the rim cushion rubber 17, the tire member includes a reinforcing member, such as a nylon reinforcing layer. Additionally, constituent members (carcass cords and coating rubbers) of the carcass layer 13 are excluded from the measurement targets of the tire gauges.

Additionally, in FIG. 2, the tire gauge Wo outward in the tire lateral direction and the tire gauge Wi inward in the tire lateral direction of the carcass layer 13 at the radial positions twice the radial height H1 of the bead cores 11 preferably meet a condition $1.0 \leq Wo/Wi \leq 10.0$, more preferably meet a condition $2.0 \leq Wo/Wi \leq 8.0$, and further preferably meet a condition $3.0 \leq Wo/Wi \leq 6.0$. Thus, the tire gauges inside and outside the carcass layer 13 in the region outward of the bead cores 11 in the radial direction are made appropriate. That is, the tire gauges in the region outward of the carcass layer 13 in the tire lateral direction have a large influence on the rim fittability of the tire. Therefore, the lower limit ensures the tire gauge Wo outward of the carcass layer 13 in the tire lateral direction and ensures the rim fittability of the tire. In addition, the upper limit suppresses an increase in tire weight due to the excessive amount of the tire gauge.

Outer Side Reinforcing Rubber

As illustrated in FIG. 2, the pneumatic tire 1 includes an outer side reinforcing rubber 19, in addition to the sidewall rubber 16 and the rim cushion rubber 17 described above.

Each of the sidewall rubbers 16 are disposed outward of the carcass layer 13 in the tire lateral direction and constitute the sidewall portions of the tire as described above. Additionally, the rubber hardness of the sidewall rubber 16 is in the range from 40 or greater to 70 or less. Furthermore, elongation at break of the sidewall rubber 16 is in the range from 400% or greater to 650% or less.

The elongation at break is measured in accordance with the JIS K6251 standard.

The rim cushion rubber 17 is disposed inward of the bead cores 11 and the turned back portion 132 of the carcass layer 13 in the tire radial direction to constitute the rim fitting surface of the bead portion as described above. Additionally, the rubber hardness of the rim cushion rubber 17 is in the range from 50 or greater to 80 or less. Furthermore, the elongation at break of the rim cushion rubber 17 is in the range from 150% or greater to 450% or less.

The outer side reinforcing rubber 19 is disposed to be sandwiched between the turned back portion 132 of the carcass layer 13 and the rim cushion rubber 17 (see FIG. 2). In such a configuration, particularly in the configuration in which the bead filler is omitted described above, the spring characteristics of the bead portion are reinforced by the outer side reinforcing rubber 19, the steering stability on dry road surfaces is ensured, and the durability of the bead portion is improved.

Furthermore, the rubber hardness of the outer side reinforcing rubber 19 is preferably in the range from 65 or greater to 105 or less, and more preferably in the range from 70 or greater to 100 or less. Thus, the above effect of the outer side reinforcing rubber 19 is properly ensured.

Additionally, the rubber hardness of the outer side reinforcing rubber 19 is higher than the rubber hardnesses of the sidewall rubber 16 and the rim cushion rubber 17. Specifically, a difference $\Delta Hs\_SW$ between the rubber hardness of the sidewall rubber 16 and the rubber hardness of the outer side reinforcing rubber 19 is preferably seven or greater, and more preferably 12 or greater. Additionally, a difference $\Delta Hs\_RC$ between the rubber hardness of the rim cushion rubber 17 and the rubber hardness of the outer side reinforcing rubber 19 is preferably three or greater, and more preferably seven or greater. Accordingly, the reinforcing effect of the spring characteristics of the bead portion caused by the outer side reinforcing rubber 19 is appropriately exhibited. Note that the lower limit of the difference ΔHs_SW in rubber hardness is subject to restrictions by the lower limit of the rubber hardness of the outer side reinforcing rubber 19 described above.

Furthermore, the elongation at break of the outer side reinforcing rubber 19 is preferably in the range from 50% or greater to 400% or less, and more preferably in the range from 70% or greater to 350% or less.

For example, in the configuration of FIG. 2, the rim cushion rubber 17 extends over completely from a bead toe Bt to a bead base Bb to form the rim fitting surface to a bead sheet 101 of a rim 10. Additionally, the rim cushion rubber 17 extends outward in the tire radial direction from the bead base Bb along the turned back portion 132 of the carcass layer 13 to form a fitting surface to a flange 102 of the rim 10. Additionally, an end portion outward of the rim cushion rubber 17 in the tire radial direction is inserted between the carcass layer 13 and the sidewall rubber 16, and extends outward in the tire radial direction with respect to the end portion of the turned back portion 132 of the carcass layer 13 and the flange 102 of the rim 10. Additionally, the bead portion may include a chafer (not illustrated).

Note that the rim cushion rubber 17 preferably extends to at least a region from a bead heel Bh to a center portion (a midpoint Cm described later) of an innermost layer in the tire radial direction of the bead cores 11. Thus, the durability of the rim fitting portion of the bead portion is properly secured.

Additionally, in the configuration of FIG. 2, the outer side reinforcing rubber 19 has a shape long in the tire radial direction, and is sandwiched between the turned back portion 132 of the carcass layer 13 and the rim cushion rubber 17. Additionally, the end portion inward in the tire radial direction of the outer side reinforcing rubber 19 overlaps with the bead core 11 in the tire radial direction. Additionally, the outer side reinforcing rubber 19 extends outward in the tire radial direction with respect to the end portion of the turned back portion 132 of the carcass layer 13, and is sandwiched between the body portion 131 of the carcass layer 13 and the sidewall rubber 16. Additionally, the outer side reinforcing rubber 19 covers the end portion of the turned back portion 132 of the carcass layer 13 from outward in the tire lateral direction. Additionally, the outer side reinforcing rubber 19 is adjacent to the turned back portion 132 of the carcass layer 13 over the entire contact portion between the body portion 131 and the turned back portion 132 of the carcass layer 13. Thus, the spring characteristics of the bead portion are appropriately reinforced by the outer side reinforcing rubber 19, the steering stability on dry road surfaces is improved, and the durability of the bead portion is improved. Additionally, the rubber hardness of the outer side reinforcing rubber 19 is higher than the rubber hardnesses of the sidewall rubber 16 and the rim cushion rubber 17. Accordingly, a distribution of the rubber hardness at or near the end portion of the turned back portion 132 of the carcass layer 13 decreases from the end portion of the carcass layer 13 toward the surface of the tire side portion. Accordingly, stress generated at or near the end portion of the carcass layer 13 is reduced, and separation of the peripheral rubber is suppressed.

Additionally, a radial height H3 from a measurement point of a tire inner diameter RD to an end portion outward of the outer side reinforcing rubber 19 in the tire radial direction and a tire cross-sectional height SH (see FIG. 1) preferably have a relationship $0.10 \leq H3/SH \leq 0.60$, and more preferably have a relationship $0.15 \leq H3/SH \leq 0.50$. Accordingly, the radial height H3 of the outer side reinforcing rubber 19 is made appropriate. In other words, the lower limit appropriately reinforces the spring characteristics of the bead portion by the outer side reinforcing rubber 19, improves the steering stability on dry road surfaces, and improves the durability of the bead portion. In addition, the upper limit suppresses an increase in tire weight due to the excessive amount of the outer side reinforcing rubber 19.

The tire inner diameter RD is equal to a rim diameter of a specified rim.

The radial height H3 is measured when the tire is mounted on the specified rim, inflated to a specified internal pressure, and in an unloaded state. Specifically, the radial height H3 is calculated as a difference between the diameter of the end portion outward of the outer side reinforcing rubber 19 in the tire radial direction and the tire inner diameter RD.

Additionally, a gauge Wr of the outer side reinforcing rubber 19 and the tire gauge Wo outward of the carcass layer 13 in the tire lateral direction at radial positions twice the radial height H1 of the bead cores 11 preferably have a relationship $0.10 \leq Wr/Wo \leq 0.90$, and more preferably have a relationship $0.20 \leq Wr/Wo \leq 0.80$. Thus, the gauge Wr of the outer side reinforcing rubber 19 is made appropriate. In other words, the lower limit appropriately reinforces the spring characteristics of the bead portion by the outer side reinforcing rubber 19, improves the steering stability on dry road surfaces, and improves the durability of the bead portion. In addition, the upper limit suppresses an increase in tire weight due to the excessive amount of the outer side reinforcing rubber 19.

In addition, in the configuration in which the outer side reinforcing rubber 19 is provided instead of the bead filler as described above, a value K defined by Equation (1) below is preferably $0.17 \leq K$, and more preferably $0.20 \leq K$. Accordingly, the function of the outer side reinforcing rubber 19 is properly ensured. In Equation (1), W denotes a tire nominal width (mm), I denotes a tire nominal inner diameter (inch), and B denotes a total cross-sectional area of bead wires in bead cores (mm²).

$$K = \frac{W^{\frac{4}{3}} \times I^{\frac{2}{3}}}{100 \times B^2} \qquad \text{Equation (1)}$$

Rate of Change of Rim Fitting Portion

In the configuration in which bead fillers are omitted as described above, the rigidity of the bead portions is reduced, and the rim fitting pressure of the bead portions tends to decrease. For the reason, in the configuration of FIG. 2, the bead core 11 has the following configuration to ensure the rim fittability of the tire.

Figure 3:
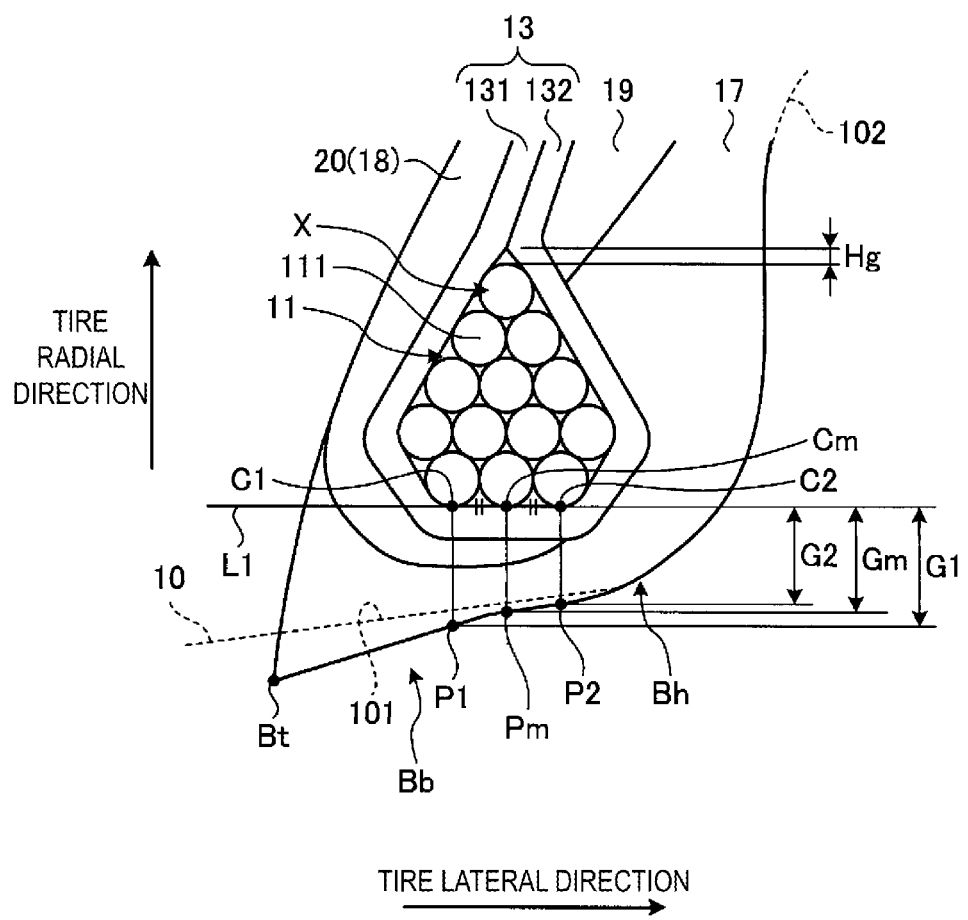
FIG. 3 is an enlarged view illustrating a rim fitting portion of the bead portion illustrated in FIG. 2.
Figure 4:
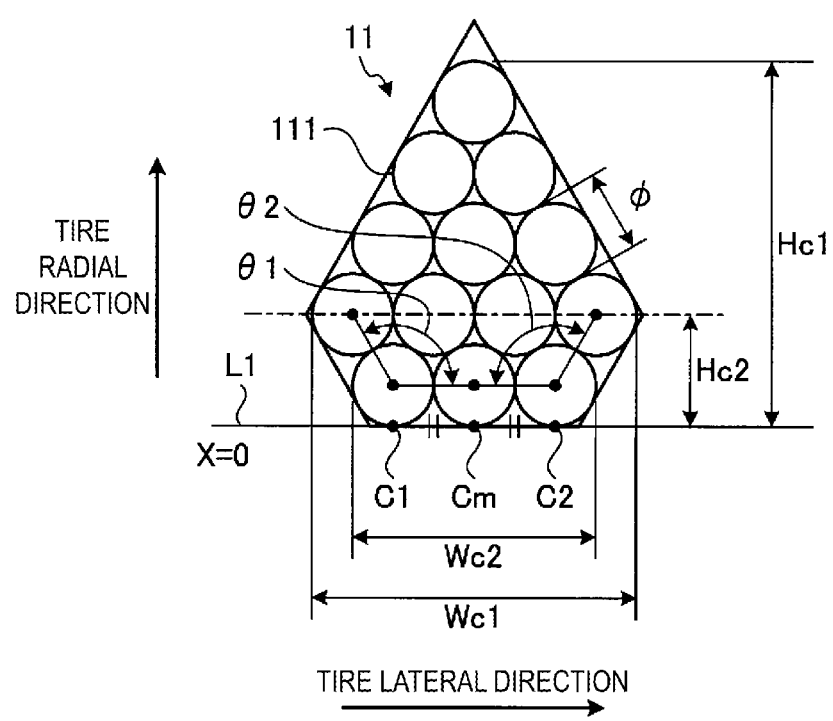
FIG. 4 is an explanatory diagram illustrating a wire arrangement structure of bead cores illustrated in FIG. 3.
Figure 5:
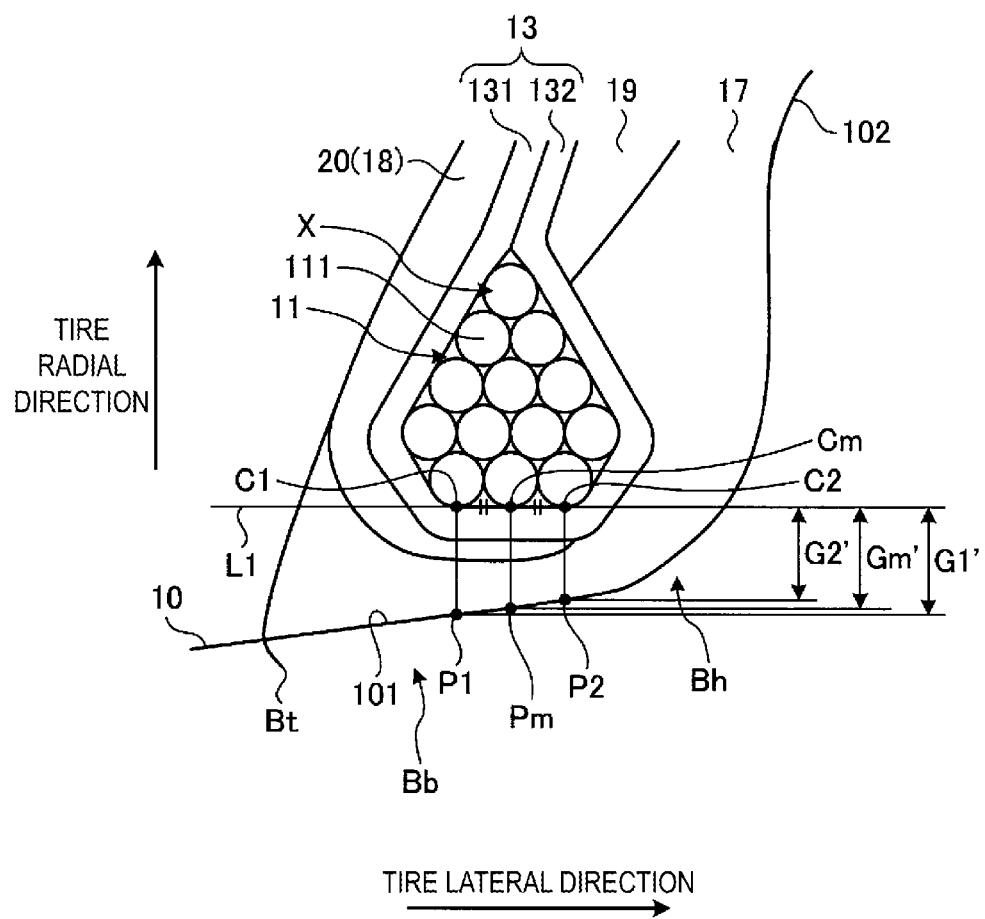
FIG. 5 is an explanatory diagram illustrating the rim fitting portion of the bead portion in a state where the tire is mounted on a rim.

FIG. 3 is an enlarged view illustrating the rim fitting portion of the bead portion illustrated in FIG. 2. FIG. 4 is an explanatory diagram illustrating the wire arrangement structure of the bead cores illustrated in FIG. 3. FIG. 5 is an explanatory diagram illustrating the rim fitting portion of the bead portion in a state where the tire is mounted on the rim. In these drawings, FIG. 3 illustrates the rim fitting portion in the state before mounting on the rim, and FIG. 5 illustrates the rim fitting portion in a state after mounting on the rim. FIG. 4 illustrates a cross-sectional view of the unvulcanized bead cores 11 in the radial direction when the components are alone.

In FIG. 2, the rim fitting surface of the bead portion includes the bead base Bb, the bead toe Bt, and the bead heel Bh, and has a contour shape uniform in the tire circumferential direction. The bead base Bb is a flat region formed inward of the bead portion in the tire radial direction and constitutes a contact surface to the bead sheet 101 of the rim 10. The bead toe Bt is a tip of the bead portion having an L shape or a V shape in the cross-sectional view in the tire meridian direction, and located innermost of the rim fitting surface in the tire lateral direction. The bead heel Bh is a bent portion that connects the wall surface of the tire side portion to the bead base Bb.

The state before the tire is mounted on the rim (see FIGS. 2 and 3) is defined as a state when the positions of the right and left bead portions are fixed so as to match measurement points of a rim width and a rim diameter of the specified rim in a state where the tire rotation axis is horizontalized and the tire alone is disposed upright. Such a tire shape is closest to the tire shape in a tire vulcanization mold, that is, a natural tire shape before inflation.

The state after the tire is mounted on the rim (see FIG. 5) is defined as a state when the tire is mounted on the specified rim, inflated to the specified internal pressure, and in an unloaded state. In the state where the tire is mounted on the rim, the rim fitting surfaces of the bead portions fit to the rim 10 of the wheel, thus holding the tire. At this time, the bead base Bb of the rim fitting surface is pressed against the bead sheet 101 of the rim 10 and brought into surface contact. Thus, the fitting portion between the bead portion and the rim 10 is sealed, and air tightness inside the tire is ensured. Additionally, the bead heel Bh is located at a connection portion between the bead sheet 101 and the flange 102, a region outside the bead heel Bh of the rim fitting surface abuts on the flange 102 of the rim 10, and the bead portion is held from outward in the tire lateral direction.

As illustrated in FIG. 4, in the cross-sectional view in the tire meridian direction, the bead cores 11 have the predetermined wire arrangement structure in which the wire cross sections of the bead wires 111 are arranged. The wire arrangement structure will be described later.

Here, in the cross-sectional view in the tire meridian direction in the state before the tire is mounted on the rim (see FIG. 3), a tangent line L1 that contacts the innermost layer in the tire radial direction and the wire cross sections innermost and outermost in the tire lateral direction in the wire arrangement structure of the bead cores 11 from the rim fitting surface side is defined. Contact points C1 and C2 of the tangent line L1 to the respective wire cross sections and the midpoint Cm of the contact points C1 and C2 are defined. Additionally, gauges G1, G2, Gm in the tire radial direction from the contact points C1 and C2 and the midpoint Cm to the rim fitting surface are defined. Specifically, in the cross-sectional view in the tire meridian direction, intersection points P1, P2, and Pm between straight lines passing through the contact points C1, C2, and the midpoint Cm and perpendicular to the tire axial direction and the bead base Bb are each drawn up. Distances between the contact points C1, C2 and the midpoint Cm and the intersection points P1, P2, and Pm are measured as the gauges G1, G2, Gm.

Similarly, gauges G1', G2', and a Gm' of the rim fitting portion in the state after the tire is mounted on the rim (see FIG. 5) are defined.

At this time, rates of change $\Delta G1$, $\Delta G2$, $\Delta Gm$ of the gauges G1, G2, Gm of the rim fitting portion in the states before and after mounting on the rim are each preferably in the range from 10% or greater to 60% or less, more preferably in the range from 15% or greater to 50% or less, further preferably in the range from 20% or greater to 45% or less, and the most preferably in the range from 25% or greater to 40% or less. Thus, the rates of change $\Delta G1$, $\Delta G2$, $\Delta Gm$ of the gauges G1, G2, Gm are set to be greater than those of a typical tire structure including bead fillers. Accordingly, the rates of change $\Delta G1$, $\Delta G2$, $\Delta Gm$ of the rim fitting portion are made appropriate. That is, the lower limit ensures rim fitting pressure and ensures rim fittability of the tire. Additionally, the upper limit suppresses deterioration of workability of mounting of the tire on the rim due to excessive rim fitting pressure.

Using the gauges Gi and Gi' before and after mounting on the rim at the predetermined measurement points, a rate of change $\Delta Gi$ is defined as $\Delta Gi=(Gi-Gi')/Gi \times 100$. For example, using the gauge G1 (see FIG. 3) before mounting on the rim and the gauge G1' (see FIG. 5) after mounting on the rim, the rate of change $\Delta G1$ is calculated as $\Delta G1=(G1-G1')/G1 \times 100$.

The rates of change $\Delta G1$, $\Delta G2$, $\Delta Gm$ of the rim fitting portion described above are achieved by, for example, a configuration of a cushion rubber layer 20 described later (see FIG. 6) and a configuration of a taper angle of the bead base Bb (see FIG. 7).

In addition, the rates of change $\Delta G1$, $\Delta G2$, $\Delta Gm$ of the rim fitting portion preferably meet the condition of $|\Delta Gm-\Delta G2|<|\Delta G1-\Delta Gm|$. Accordingly, a difference in rate of change $|\Delta G1-\Delta Gm|$ on the bead toe Bt is set greater than a difference in rate of change $|\Delta Gm-\Delta G2|$ on the bead heel Bh. Specifically, the rates of change $\Delta G1$, $\Delta G2$, $\Delta Gm$ preferably meet the condition $20\% \leq |(\Delta G1-\Delta Gm)/(\Delta Gm-\Delta G2)| \leq 450\%$, and more preferably meet the condition $30\% \leq |(\Delta G1-\Delta Gm)/(\Delta Gm-\Delta G2)| \leq 300\%$. Thus, the relationship between the rates of change $\Delta G1$, $\Delta G2$, $\Delta Gm$ of the rim fitting portion is made appropriate. That is, the lower limit improves the rim fittability of the tire. Additionally, the upper limit improves workability of mounting of the tire on the rim.

In addition, the rates of change $\Delta G1$, $\Delta G2$, $\Delta Gm$ of the gauges G1, G2, Gm of the rim fitting portion preferably have a relationship $\Delta G2 < \Delta Gm < \Delta G1$. In other words, the rates of change $\Delta G1$, $\Delta G2$, $\Delta Gm$ increase toward the bead toe Bt. Thus, the rim fittability of the tire is improved.

Additionally, in the configuration of FIG. 3, the gauge G1, G2, Gm of the rim fitting portion in the state before mounting the tire on the rim have a relationship $G2<Gm<G1$. In other words, the gauges G1, G2, Gm of the rim fitting portion increase toward the bead toe Bt. Thus, the mutual relationship between the rates of change $\Delta G1$, $\Delta G2$, $\Delta Gm$ is made appropriate. Additionally, in a passenger vehicle tire, the gauge G1 is preferably in the range $G1 \leq 8.0$ mm, and more preferably in the range $G1 \leq 6.0$ mm. Also, the gauges G2 is preferably in the range $1.0$ mm$\leq G2$, and more preferably in the range $2.0$ mm$\leq G2$. Thus, the rubber volume of the rim fitting portion inward of the bead cores 11 in the radial direction is made appropriate.

Additionally, a width Wc2 (mm) (see FIG. 4) of the innermost layer of the wire arrangement structure of the bead cores 11, the rate of change $\Delta Gm$ (%) at the midpoint Cm, and the tire inner diameter RD (inch) (see FIG. 2) preferably have a relationship $1.0\% \cdot \text{mm/inch} \leq Wc2 \times \Delta Gm/RD \leq 50\% \cdot \text{mm/inch}$, more preferably have a relationship $2.0\% \cdot \text{mm/inch} \leq Wc2 \times \Delta Gm/RD \leq 40\% \cdot \text{mm/inch}$, and more preferably have a relationship $5.0\% \cdot \text{mm/inch} \leq Wc2 \times \Delta Gm/RD \leq 30\% \cdot \text{mm/inch}$. Thus, the relationship between the width Wc2 of the innermost layer of the bead cores 11 and the rate of change $\Delta Gm$ is made appropriate. That is, the lower limit ensures the rim fittability of the tire. Additionally, the upper limit improves the workability of mounting of the tire on the rim.

As illustrated in FIG. 4, the width Wc2 of the innermost layer of the wire arrangement structure is measured as the maximum width including the wire cross sections on the innermost side and the outermost side in the tire lateral direction.

In addition, the width Wc2 of the innermost layer of the wire arrangement structure is preferably in the range 3.0 mm≤Wc2≤10.0 mm, and more preferably in the range 4.5 mm≤Wc2≤9.6 mm.

Wire Arrangement Structure of Bead Cores

As illustrated in FIG. 4, the bead cores 11 are formed by annularly and multiply winding the bead wires 111, and have the predetermined wire arrangement configuration in the cross-sectional view in the tire meridian direction. The wire arrangement structure is defined by the arrangement of the wire cross sections of the bead wires 111. Additionally, the wire arrangement structure is formed by a plurality of layers layered in the tire radial direction. These layers are formed of the plurality of wire cross-sections arranged in a row in the tire lateral direction. Moreover, the innermost layer of the wire arrangement structure is substantially parallel to the rim fitting surface of the bead portion and is opposed to the bead sheet 101 of the rim 10 during fitting of the tire on the rim (see FIG. 3).

In a manufacturing process of the bead cores 11, a core molding jig (not illustrated) is used, and one or a plurality of the bead wires 111 are wound around the core molding jig in the predetermined wire arrangement structure to mold the unvulcanized bead cores 11. Then, the molded bead cores 11 are pre-vulcanized before a vulcanization molding step of a green tire. Note that no such limitation is intended, and the pre-vulcanization of the bead cores 11 may be omitted. The unvulcanized bead cores 11 may be incorporated into the green tire, and the vulcanization molding step of the green tire may be performed.

Additionally, the bead wire 111 is formed of a wire strand and an insulation rubber covering the wire strand (not illustrated). Additionally, the wire strand is made of steel. Additionally, the insulation rubber is preferably made of a rubber composition having a Mooney viscosity of 70 M or greater. The Mooney viscosity is calculated in accordance with JIS K6300-1: 2013.

Here, in the configuration of FIG. 2, as described above, the turned back portion 132 of the carcass layer 13 contacts the body portion 131 of the carcass layer 13 to form the closed region X surrounding the bead cores 11. In addition, the rubber occupancy ratio in the closed region X is set to be small to achieve the weight reduction of the bead portion. At this time, to increase the durability of the bead portion, a cavity portion in the closed region X is preferably suppressed.

Thus, as illustrated in FIG. 4, the wire arrangement structure of the bead cores 11 has a wedge shape that protrudes toward outward in the tire radial direction. Specifically, a layer in which the number of arrangements of the wire cross sections is the maximum in the wire arrangement structure (in FIG. 4, the second layer from the innermost layer) is defined as the maximum arrangement layer. At this time, the number of layers of the wire cross sections outward in the tire radial direction with respect to the maximum arrangement layer (three layers in FIG. 4) is greater than the number of layers of the wire cross sections inward in the tire radial direction with respect to the maximum arrangement layer (one layer in FIG. 4). Additionally, the number of arrangements of the wire cross sections in each layer outward in the tire radial direction with respect to the maximum arrangement layer monotonically decreases outward in the tire radial direction from the maximum arrangement layer. Furthermore, the number of layers of the wire cross sections is preferably in the range from four or greater to six or less. Additionally, the number of arrangements of the wire cross sections in the maximum arrangement layer in the wire arrangement structure is preferably four or five, and the number of arrangements of the wire cross sections in the outermost layer in the tire radial direction is preferably one or two.

The wire cross sections are preferably arranged in a closest-packed structure in the region outward in the tire radial direction with respect to the maximum arrangement layer. The "closest-packed structure" refers to a state in which centers of the three adjacent wire cross sections are arranged to form a substantially equilateral triangle in the cross-sectional view in the tire meridian direction. In such a closest-packed structure, disposal density of the wire cross sections of the bead cores 11 is increased and a core-collapse resistance of the bead cores 11 is improved compared to a lattice arrangement structure in which the rows of the wire cross sections are orthogonal vertically and horizontally. Note that, in the closest-packed state, it is not necessary for all sets of the adjacent wire cross sections to come into contact with one another, and some sets may be disposed with fine gaps (not illustrated).

In such a configuration, as illustrated in FIG. 3, the body portion 131 and the turned back portion 132 of the carcass layer 13 extend outward in the tire radial direction along the wedge shape of the wire arrangement structure while abutting on the right and left side surfaces in the tire lateral direction of the bead cores 11, and are joined in a Y-shape to come into contact with one another. Thus, a gap between the joining portion of the body portion 131 with the turned back portion 132 of the carcass layer 13 and the top portion (so-called bead top) outward of the bead core 11 in the tire radial direction becomes small, and the durability of the bead portion is improved. In particular, the structure in which bead fillers are omitted described above is preferred in that the rubber occupancy ratio in the closed region X can be reduced. In addition, since the turned back portion 132 can bend at an obtuse angle at the joining position with the body portion 131, the amount of bending of the turned back portion 132 becomes small, and the durability of the bead portion is improved.

The number of arrangements of the wire cross sections in the innermost layer in the tire radial direction in the wire arrangement structure is preferably three or four, and is preferably same as or smaller than the number of arrangements of the wire cross sections in the maximum arrangement layer.

As illustrated in FIG. 4, arrangement angles $\theta 1$, $\theta 2$ of the wire cross sections at corner portions inward in the tire radial direction and inward and outward in the tire lateral direction in the wire arrangement structure are each defined. At this time, the arrangement angles $\theta 1$, $\theta 2$ are in the range 80 degrees≤$\theta 1$, and 80 degrees≤$\theta 2$. That is, the arrangement angles $\theta 1$, $\theta 2$ of the wire cross sections form substantially right angles or obtuse angles. In addition, as illustrated in FIG. 4, the arrangement angles $\theta 1$, $\theta 2$ of the wire cross sections are preferably in the range 100 degrees≤$\theta 1$≤150 degrees, and 100 degrees≤$\theta 2$≤150 degrees. Thus, disruption of the wire arrangement structure during tire vulcanization is suppressed, the rim fittability of the tire is improved, and the durability of the bead portion is improved. Also, when the arrangement angles $\theta 1$, $\theta 2$ of the wire cross sections have the obtuse angles, the carcass ply can be turned back along the corner portions inward of the bead cores 11 in the tire radial direction. Accordingly, the rubber occupancy ratio in the closed region X can be reduced, and the weight of the bead portion can be reduced further.

The arrangement angles $\theta 1$, $\theta 2$ are measured as angles formed by lines connecting the centers of the three wire cross-sections constituting the corner portions of the wire arrangement structure.

Additionally, in FIG. 4, a maximum width Wc1 and a maximum height Hc1 of the bead cores 11 and a total cross-sectional area S of the bead wires 111 in the bead cores 11 preferably have a relationship $1.20 \leq Wc1 \times Hc1/S \leq 5.00$, more preferably have a relationship $1.50 \leq Wc1 \times Hc1/S \leq 4.50$, and more preferably have a relationship $1.80 \leq Wc1 \times Hc1/S \leq 4.00$. Thus, the wire arrangement structure of the bead cores 11 is made appropriate. That is, the lower limit ensures the number of arrangements of the wire cross sections, and ensures the rim fittability of the tire. In addition, the upper limit reduces the weight of the bead cores 11.

Note that the total cross-sectional area S of the bead wires does not include the cross-sectional area of the insulation rubbers.

Furthermore, the total cross-sectional area S of the bead wires 111 is preferably in the range $5 \text{ mm}^2 \leq S \leq 35 \text{ mm}^2$, more preferably in the range $6 \text{ mm}^2 \leq S \leq 32 \text{ mm}^2$, and further preferably in the range $7 \text{ mm}^2 \leq S \leq 28 \text{ mm}^2$. Thus, the total cross-sectional area S of the bead wires 111 is made appropriate. Specifically, the lower limit ensures the total cross-sectional area S of the bead wires 111 and ensures the rim fittability of the tire. In addition, the upper limit reduces the weight of the bead cores 11.

In addition, an outer diameter $\varphi$ (see FIG. 4) of the bead wire 111 is preferably in the range $0.8 \text{ mm} \leq \varphi \leq 1.5 \text{ mm}$, and more preferably in the range $0.9 \text{ mm} \leq \varphi \leq 1.4 \text{ mm}$, and further preferably in the range $1.0 \text{ mm} \leq \varphi \leq 1.3 \text{ mm}$ Thus, the outer diameter $\varphi$ of the bead wire 111 is made appropriate. That is, the lower limit ensures the outer diameter $\varphi$ of the bead wire 111, and ensures the rim fittability of the tire. In addition, the upper limit reduces the weight of the bead cores 11.

Additionally, in FIG. 4, a height Hc2 from the tangent line L1 of the innermost layer in the wire arrangement to the maximum width position of the bead cores 11, and the maximum height Hc1 of the bead cores 11 preferably have a relationship $1.10 \leq (Hc1-Hc2)/Hc2 \leq 2.80$, and preferably have a relationship $1.30 \leq (Hc1-Hc2)/Hc2 \leq 2.50$, and more preferably have a relationship $1.50 \leq (Hc1-Hc2)/Hc2 \leq 2.30$. Thus, the wire arrangement structure of the bead cores 11 is made appropriate.

The maximum height Hc1 of the bead cores is measured as the maximum height of the bead cores from the tangent line L1.

The height Hc2 of the widest position of the bead cores is measured as a distance between the tangent line L1 and an imaginary line connecting the centers of the wire cross sections constituting the maximum arrangement layer. In a configuration in which the wire arrangement structure includes the plurality of maximum arrangement layers, the maximum arrangement layer on the outermost in the tire radial direction is used to measure the height Hc2 of the maximum width position.

For example, in the configuration of FIG. 4, the number of layers of the wire cross sections is five, and the number of arrangements of the wire cross sections is set to 3-4-3-2-1 in the order from the innermost layer in the tire radial direction. Thus, the number of arrangements of the wire cross sections in the maximum arrangement layer is four. Additionally, the number of layers of the wire cross sections outward in the tire radial direction with respect to the maximum arrangement layer is three, and the number of layers of the wire cross sections inward in the tire radial direction with respect to the maximum arrangement layer is one. Accordingly, the maximum arrangement layer is asymmetric in the tire radial direction and disposed so as to be biased inward in the tire radial direction with respect to the center position in the tire radial direction of the wire arrangement structure. The wire arrangement structure has a structure long outward in the tire radial direction from the maximum arrangement layer. Moreover, the number of arrangements of the wire cross sections in each layer decreases one by one outward in the tire radial direction from the maximum arrangement layer. Also, all wire cross-sections are arranged in the closely-packed structure. Thus, both of the arrangement angles $\theta 1$, $\theta 2$ of the wire cross sections at the left and right corner portions in the tire radial direction of the wire arrangement structure are approximately 135 degrees (specifically, in the range from 130 degrees to 140 degrees). Moreover, the maximum arrangement layer of the wire cross-sections is not the innermost layer in the tire radial direction. In addition, the number of arrangements of the wire cross sections in each layer increases one by one from the innermost layer to the maximum arrangement layer. This optimizes the wire arrangement structure.

Additionally, in FIG. 3, a distance Hg in the tire radial direction from the end portion outward of the bead cores 11 in the tire radial direction to the contact portion between the body portion 131 and the turned back portion 132 of the carcass layer 13 preferably has a relationship $Hg/\varphi \leq 7.0$ to the outer diameter $\varphi$ of the bead wire 111, and more preferably has a relationship $Hg/\varphi \leq 3.0$. Thus, the rigidity around the bead cores 11 is improved. Note that the lower limit of the ratio $Hg/\varphi$ is $0 \leq Hg/\varphi$ in the case of $Hg=0$.

Gauges of Rim Fitting Portion

Figure 6:
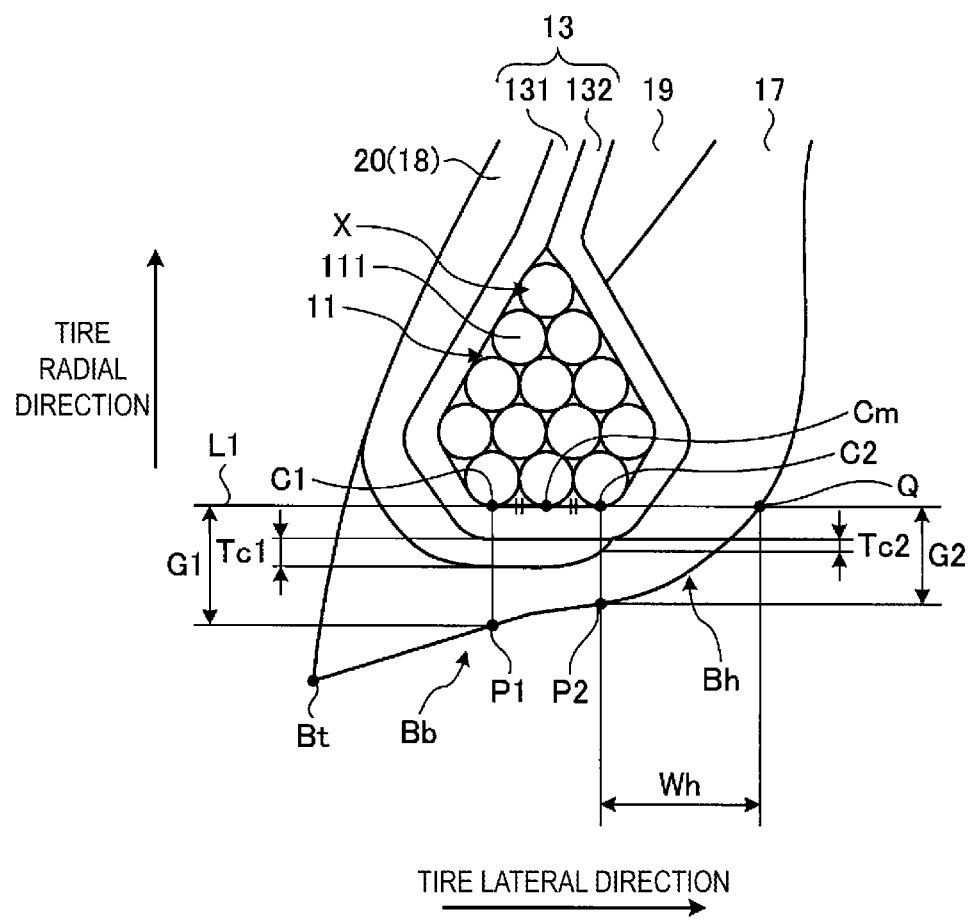
FIG. 6 is an explanatory diagram illustrating the rim fitting portion illustrated in FIG. 3.

FIG. 6 is an explanatory diagram illustrating the rim fitting portion illustrated in FIG. 3. The same drawing illustrates the rim fitting portion in the state before mounting on the rim. In the same drawing, constituents that are the same as constituents illustrated in FIG. 3 have the same reference signs, and explanations thereof are omitted.

In FIG. 6, as described above, the gauge G2 in the tire radial direction from the contact point C2 between the tangent line L1 of the innermost layer of the wire arrangement and the wire cross section outermost in the tire lateral direction to the rim fitting surface is defined. At this time, the gauge G2 and the outer diameter $\varphi$ (see FIG. 4) of the bead wire 111 preferably have a relationship $1.3 \leq G2/\varphi \leq 9.5$, and more preferably have a relationship $1.8 \leq G2/\varphi \leq 5.5$. Thus, the gauge G2 of the rim fitting portion is made appropriate. Specifically, the lower limit ensures the gauge G2 of the rim fitting portion and ensures the rim fittability of the tire. Additionally, the upper limit suppresses deterioration of workability of mounting of the tire on the rim due to the excessive gauge G2 of the rim fitting pressure.

Additionally, in FIG. 6, an intersection point Q between a straight line passing through the contact point C2 of the bead core 11 and parallel to the tire lateral direction and a wall surface outward of the rim fitting portion in the tire lateral direction is defined. Also, a gauge Wh in the tire lateral direction from the contact point C2 of the bead core 11 to the point Q at the rim fitting surface is defined. At this time, the gauge Wh and the outer diameter $\varphi$ (see FIG. 4) of the bead wire 111 preferably have a relationship $2.0 \leq Wh/\varphi \leq 15.0$, and more preferably have a relationship $2.5 \leq Wh/\varphi \leq 10.0$. Thus, the gauge Wh of the rim fitting portion is made appropriate. That is, the lower limit ensures the gauge Wh of the rim fitting portion, ensures the rim fittability of the tire, and ensures the durability of the rim fitting portion. Additionally, the upper limit suppresses deterioration of workability of mounting of the tire on the rim due to the excessive gauge Wh of the rim fitting pressure.

Additionally, as illustrated in FIG. 6, the cushion rubber layer 20 is inserted between the innermost layer of the bead cores 11 and the rim cushion rubber 17. The cushion rubber layer 20 is a member having a rubber hardness lower than that of the rim cushion rubber 17, includes, for example, the innerliner 18 and a tie rubber (not illustrated) that bonds the innerliner 18 and the carcass layer 13 together, and does not include the carcass ply. Additionally, the cushion rubber layer 20 may have an integral structure with the innerliner 18 and the tie rubber, or may have a separate structure (not illustrated). Additionally, the cushion rubber layer 20 may be made of a rubber material same as those of the innerliner 18 and the tie rubber described above, or may be made of a different rubber material (not illustrated). The cushion rubber layer 20 traverses a range from the contact point C1 to the midpoint Cm of the bead cores 11 in the tire lateral direction, and preferably a range from the contact point C1 to the contact point C2. In such a configuration, the cushion rubber layer 20 is interposed between the innermost layer of the bead cores 11 and the rim fitting surface of the bead portion. This increases the rates of change $\Delta G1$, $\Delta G2$, $\Delta Gm$ of the rim fitting portion, thus improving the rim fittability of the tire. Additionally, the contact pressure of the rim fitting surface to the rim 10 is made uniform.

Additionally, the rubber hardness of the cushion rubber layer 20 is preferably lower than the rubber hardness of the rim cushion rubber 17 by five or greater and more preferably eight or greater. Thus, the effect of increasing the rates of change $\Delta G1$, $\Delta G2$, $\Delta Gm$ of the rim fitting portion is appropriately obtained.

For example, in the configuration of FIG. 6, in the cross-sectional view in the tire meridian direction, the cushion rubber layer 20 extends outward in the tire lateral direction from the tire cavity surface along the turned back portion 132 of the carcass layer 13 and is interposed between the bead cores 11 and the rim cushion rubber 17. Also, the cushion rubber layer 20 extends up to the outermost contact point C2 beyond the midpoint Cm of the innermost layer of the bead cores 11. Additionally, the end portion outward of the cushion rubber layer 20 in the tire lateral direction terminates inward in the tire radial direction with respect to the tangent line L1 of the bead cores 11. Accordingly, the end portion of the cushion rubber layer 20 does not extend up to the side surface outward of the bead cores 11 in the tire lateral direction. Thus, the rates of change $\Delta G1$, $\Delta G2$, $\Delta Gm$ between the bead cores 11 and the rim fitting surface (in particular, the bead base Bb) are effectively increased while the rigidity between the bead cores 11 and the flange 102 (see FIG. 2) of the rim 10 is properly ensured. However, no such limitation is intended, and the end portion outward of the cushion rubber layer 20 in the tire lateral direction may extend up to outward in the tire radial direction with respect to the tangent line L1 of the bead cores 11.

Additionally, in FIG. 6, thicknesses Tc1, Tc2 of the cushion rubber layer 20 in between the measurement points C1 and P1; and C2 and P2 of the gauges G1, G2 of the rim fitting portion preferably have a relationship Tc2<Tc1. In other words, the thickness Tc1 of the cushion rubber layer 20 on the bead toe Bt side is preferably thicker than the thickness Tc2 of the cushion rubber layer 20 on the bead heel Bh side. Thus, the rate of change $\Delta G1$ of the rim fitting portion on the bead toe Bt side becomes greater than the rate of change $\Delta G2$ of the rim fitting portion on the bead heel Bh side ($\Delta G2 < \Delta G1$), and the rim fittability of the tire is improved.

Additionally, as described above, adjusting the relationship of the thicknesses of the cushion rubber layer 20 in between the measurement points C1 and P1; C2 and P2; and Cm and Pm of the gauges G1, G2, Gm of the rim fitting portion allows adjusting the relationship between the rates of change $\Delta G1$, $\Delta G2$, $\Delta Gm$ of the rim fitting portion.

Additionally, an average value of the thicknesses of the cushion rubber layer 20 in the region in the tire lateral direction from the contact point C1 to the contact point C2 is preferably in the range from 0.3 mm or greater to 3.0 mm or less. Thus, the average thickness of the cushion rubber layer 20 is made appropriate. In other words, the lower limit appropriately obtains the effect of the cushion rubber layer 20 that increases the rates of change $\Delta G1$, $\Delta G2$, $\Delta Gm$ of the rim fitting portion. Additionally, the upper limit suppresses the decrease in rigidity of the rim fitting portion caused by the excessive amount of the cushion rubber layer 20.

Additionally, in FIG. 6, the gauge G1 of the rim fitting portion on the bead toe Bt side and the thickness Tc1 of the cushion rubber layer 20 preferably have a relationship $0.03 \le Tc1/G1 \le 0.95$, and more preferably have a relationship $0.05 \le Tc1/G1 \le 0.85$. Thus, the average thickness of the cushion rubber layer 20 is made appropriate. That is, the lower limit properly ensures the effect of the cushion rubber layer 20, and increases the rate of change $\Delta G1$ of the rim fitting portion. Additionally, the upper limit ensures the gauge G1 of the rim cushion rubber 17, and properly ensures the rim fittability of the tire.

Additionally, on the tire cavity portion side, the cushion rubber layer 20 extends outward in the tire radial direction from the measurement point of the height H1 (see FIG. 2) of the bead cores 11 outward in the tire radial direction preferably by 5 mm or greater.

Shape of Rim Fitting Surface

Figure 7:
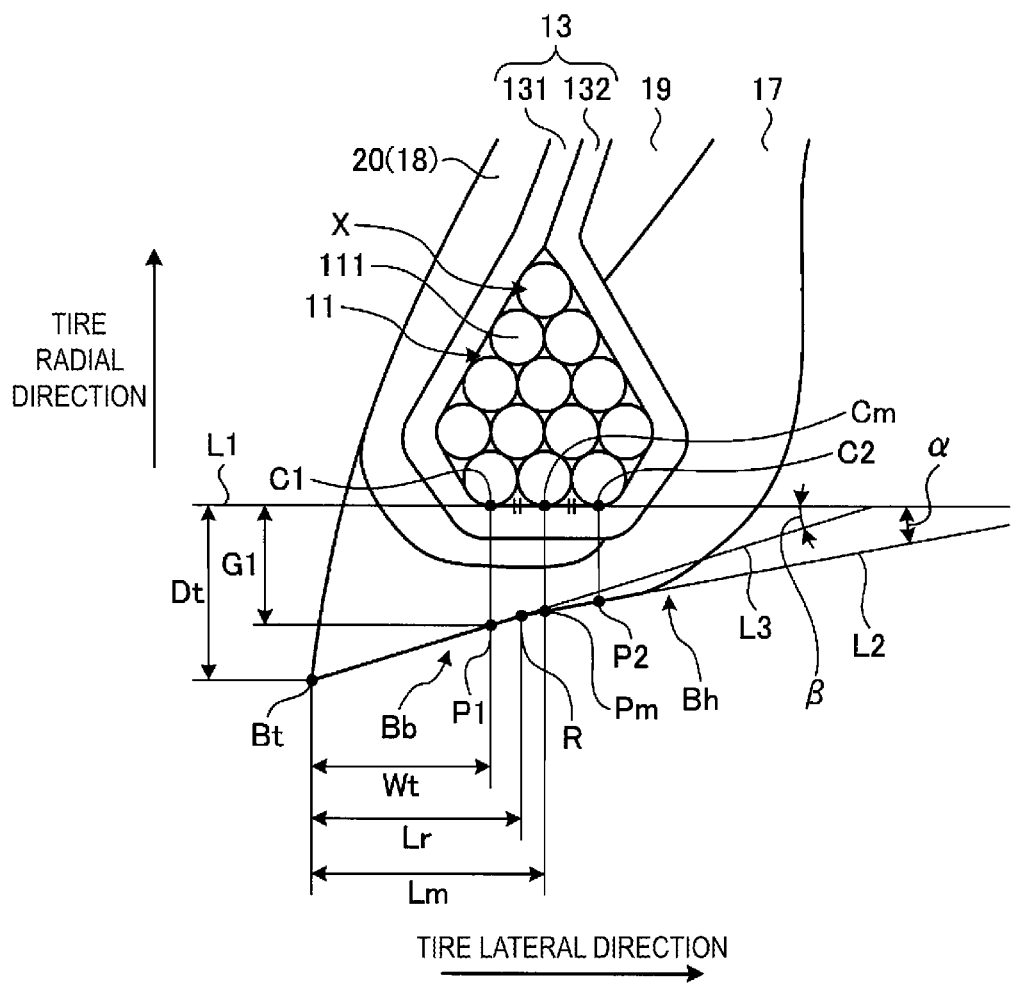
FIG. 7 is an explanatory diagram illustrating the rim fitting portion illustrated in FIG. 3.

FIG. 7 is an explanatory diagram illustrating the rim fitting portion illustrated in FIG. 3. The same drawing illustrates the rim fitting portion in the state before mounting on the rim. In the same drawing, constituents that are the same as constituents illustrated in FIG. 3 have the same reference signs, and explanations thereof are omitted.

As illustrated in FIG. 7, in the cross-sectional view in the tire meridian direction in the state before mounting on the rim, a tangent line of the rim fitting surface at an intersection point P2 is defined as an extension line L2 of the bead base Bb.

At this time, an inclination angle $\alpha$ of the extension line L2 of the bead base Bb with respect to the tangent line L1 of the bead cores 11 is preferably in the range 3 degrees$\le \alpha \le$15 degrees, and more preferably in the range 6 degrees$\le \alpha \le$12 degrees.

Additionally, the inclination angle $\alpha$ (degree) of the extension line L2 of the bead base Bb, the rate of change $\Delta Gm$ (%) of the rim fitting portion, and a tire nominal width WA (dimensionless) preferably have a relationship 0%·degree$\le \Delta Gm \times \alpha/WA \le$7%·degree, and more preferably have a relationship 0.5%·degree$\le \Delta Gm \times \alpha/WA \le$5.0%·degree. Thus, a ratio $\Delta Gm \times \alpha/WA$ indicative of the rim fittability of the tire is made appropriate. In other words, in general, as the tire nominal width WA becomes large, the rim fittability of the tire tends to be low. Additionally, the greater the inclination angle $\alpha$ of the bead base Bb and the rate of change $\Delta Gm$ of the rim fitting portion, the greater the fitting pressure to the rim, thus improving the rim fittability of the tire. Accordingly, the lower limit increases the ratio $\Delta Gm \times \alpha/WA$, and improves the rim fittability of the tire. Additionally, the upper limit suppresses deterioration of workability of mounting of the tire on the rim due to excessive fitting pressure to the rim. Note that when the inclination angle $\alpha=0$ degrees, $\Delta Gm \times \alpha/WA=0$ is met.

Additionally, as illustrated in FIG. 7, in the cross-sectional view in the tire meridian direction, when the bead base Bb has a shape formed by connecting the two types of linear portions with the mutually different inclination angles (so-called two-stage tapered shape), the extension line L2 of the linear portion on the bead heel Bh side and an extension line L3 of the linear portion on the bead toe Bt side of the bead base Bb of the rim fitting surface are defined.

At this time, the inclination angles $\alpha$, $\beta$ of the extension lines L2 and L3 of the bead base Bb with respect to the tangent line L1 of the bead cores 11 preferably have a relationship $0 \leq \beta/\alpha \leq 5.0$, and more preferably have a relationship $1.8 \leq \beta/\alpha \leq 4.0$. Thus, the two-stage tapered shape of the bead base Bb is made appropriate. In other words, the lower limit appropriately obtains the effect of improving the rim fittability of the tire brought by the two-stage tapered shape. Additionally, the upper limit suppresses the occurrence of vulcanization failure in the bead base Bb.

Additionally, in FIG. 7, the intersection point R of the two types of linear portions of the bead base Bb is defined.

At this time, a distance Lr in the tire lateral direction from the bead toe Bt to the intersection point R and a distance Lm in the tire lateral direction from the bead toe Bt to the midpoint Cm preferably have a relationship $0.50 \leq Lr/Lm \leq 4.0$, and more preferably have a relationship $0.70 \leq Lr/Lm \leq 3.3$. Thus, the position of the intersection point R is made appropriate, and the effect of improving the rim fittability of the tire brought by the two-stage tapered shape is appropriately obtained.

For example, in the configuration of FIG. 7, the arrangement angle $\theta 1$ (see FIG. 4) of the wire cross sections at the corner portion inward in the tire radial direction and inward in the tire lateral direction of the wire arrangement of the bead cores 11 is in the range from 130 degrees or greater to 140 degrees or less. Additionally, the two types of linear portions of the bead base Bb are connected with a smooth arc that protrudes outward in the tire radial direction. Also, the intersection point R is located between the contact point C1 and the midpoint Cm of the bead cores 11.

In FIG. 7, a distance Dt in the tire radial direction from the contact point C1 of the bead cores 11 to the bead toe Bt and a distance Wt in the tire lateral direction are each defined. At this time, the distances Dt, Wt and the gauge G1 in the tire radial direction from the contact point C1 to the rim fitting surface preferably have a relationship $7 \text{ degrees} \leq \arctan\{(Dt-G1)/Wt\} \leq 30$ degrees, and more preferably have the relationship $9 \text{ degrees} \leq \arctan\{(Dt-G1)/Wt\} \leq 25$ degrees. Thus, a gradient of the rim fitting surface with respect to the tire axial direction from the bead cores 11 to the bead toe Bt is made appropriate. That is, the lower limit ensures the gradient of the rim fitting surface, and ensures the rim fittability of the tire. Additionally, the upper limit suppresses a decrease in workability of mounting of the tire on the rim due to excessive gradient of the rim fitting surface.

The distance Dt from the contact point C1 to the bead toe Bt and the distance Wt are measured in the state before mounting of the tire on the rim.

Modified Examples

FIGS. 8 to 12 are explanatory diagrams illustrating the modified examples of the bead cores illustrated in FIG. 4. These drawings illustrate a cross-sectional view of the unvulcanized bead cores 11 in the radial direction when the components are alone.

In the configuration of FIG. 4, the tangent line L1 to the innermost layer of the bead cores 11 is parallel to the tire lateral direction. Accordingly, the inclination angle X of the tangent line L1 with respect to the tire lateral direction is X=0 degrees.

Figure 8:
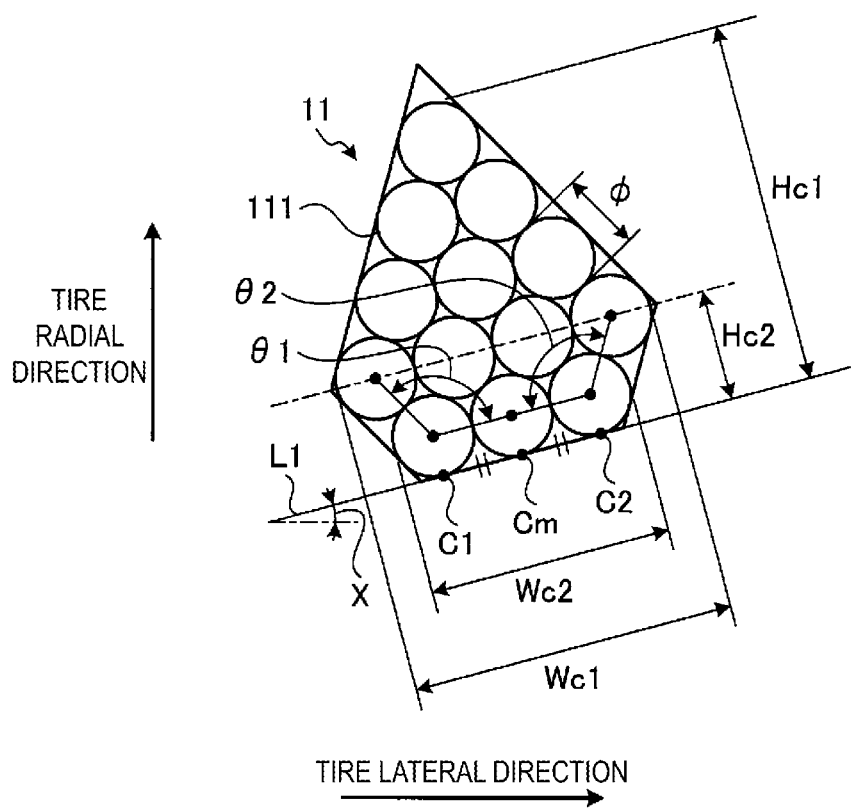
FIG. 8 is an explanatory diagram illustrating a modified example of the bead cores illustrated in FIG. 4.

However, no such limitation is intended, and as illustrated in FIG. 8, the bead cores 11 may be inclined to the tire lateral direction. Specifically, the bead cores 11 may be inclined inward in the tire radial direction on the bead toe Bt (see FIG. 3) side. In such a configuration, the tangent line L1 of the innermost layer of the bead cores 11 approaches the bead base Bb of the rim fitting surface in parallel. At this time, the inclination angle X of the tangent line L1 with respect to the tire lateral direction is preferably in the range from $-10 \text{ degrees} \leq X \leq 30$ degrees. Note that the range of the relative inclination angle $\alpha$ of the extension line L2 of the bead base Bb with respect to the tangent line L1 of the bead cores 11 is as described above.

Additionally, in the configuration of FIG. 4, as described above, the number of arrangements of the wire cross sections is set to 3-4-3-2-1 in the order from the innermost layer in the tire radial direction. Thus, the number of layers of the wire cross sections is five, and the number of arrangements of the wire cross sections in the outermost layer in the tire radial direction is one.

Figure 9:
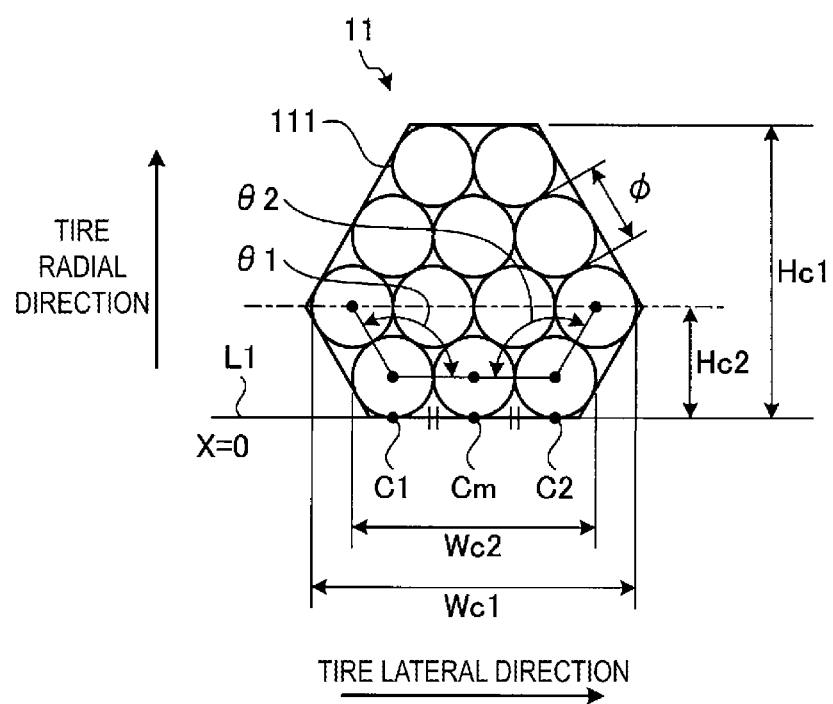
FIG. 9 is an explanatory diagram illustrating a modified example of the bead cores illustrated in FIG. 4.
Figure 10:
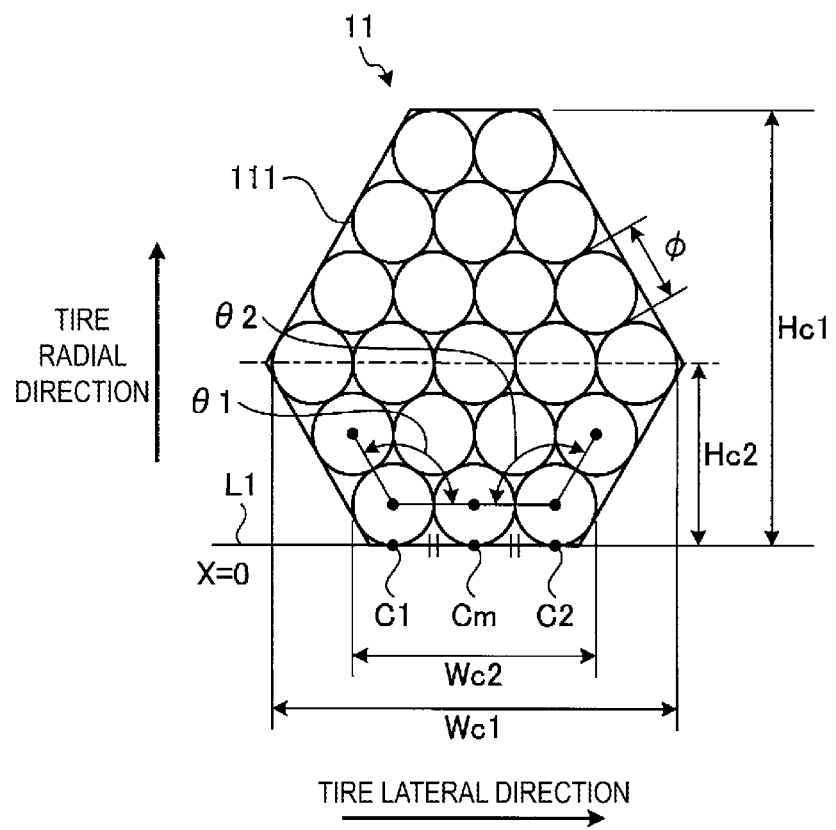
FIG. 10 is an explanatory diagram illustrating a modified example of the bead cores illustrated in FIG. 4.

In contrast, in the configuration of FIG. 9, the number of layers of the wire cross-sections is four, and the number of arrangements of the wire cross sections is set to 3-4-3-2 in the order from the innermost layer in the tire radial direction. In the configuration illustrated in FIG. 10, the number of layers of the wire cross-sections is six, and the number of arrangements of the wire cross sections is set to 3-4-5-4-3-2 in the order from the innermost layer in the tire radial direction. Thus, the number of layers of the wire cross sections may be four or six. Additionally, the number of arrangements of the wire cross sections of the outermost layer in the tire radial direction may be two. In such cases, the numbers of layers of the wire cross sections outward in the tire radial direction with respect to the maximum arrangement layer (two layers in FIG. 9 and three layers in FIG. 10) are greater than the numbers of layers of the wire cross sections inward in the tire radial direction with respect to the maximum arrangement layer (one layer in FIG. 9 and two layers in FIG. 10). Moreover, the number of arrangements of the wire cross sections in each layer decreases one by one outward in the tire radial direction from the maximum arrangement layer.

Additionally, in the configuration of FIG. 4, the number of arrangements of the wire cross sections in the innermost layer in the tire radial direction is less than the number of arrangements of the wire cross sections in the maximum arrangement layer (the second layer from the innermost layer). Also, all wire cross-sections that constitute the wire arrangement structure are arranged in the closely-packed structure. Thus, both of the arrangement angles $\theta 1$, $\theta 2$ of the wire cross sections at the corner portions inward in the tire radial direction and inward and outward in the tire lateral direction in the wire arrangement structure are in the range from 130 degrees or greater to 140 degrees or less.

Figure 11:
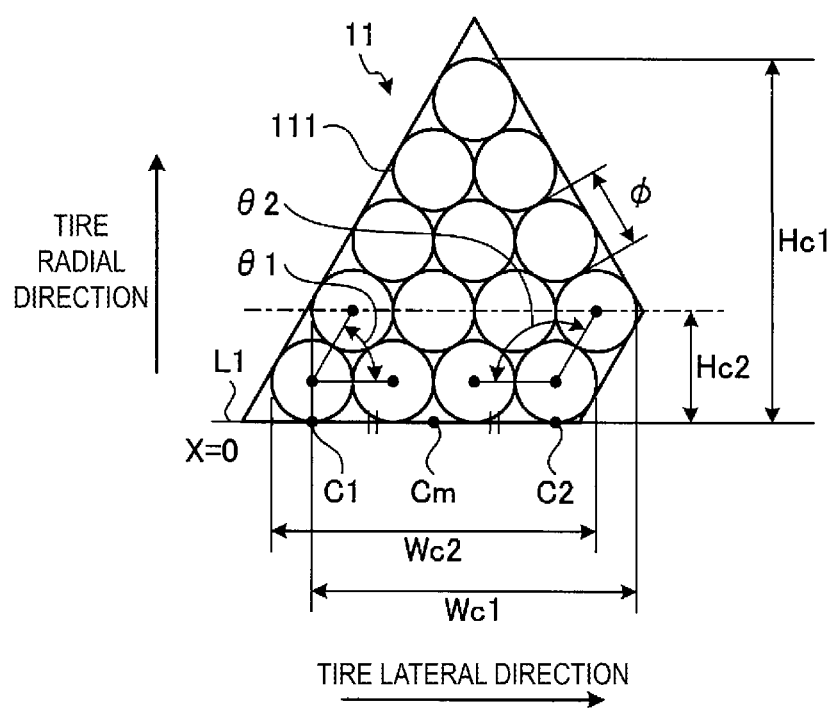
FIG. 11 is an explanatory diagram illustrating a modified example of the bead cores illustrated in FIG. 4.
Figure 12:
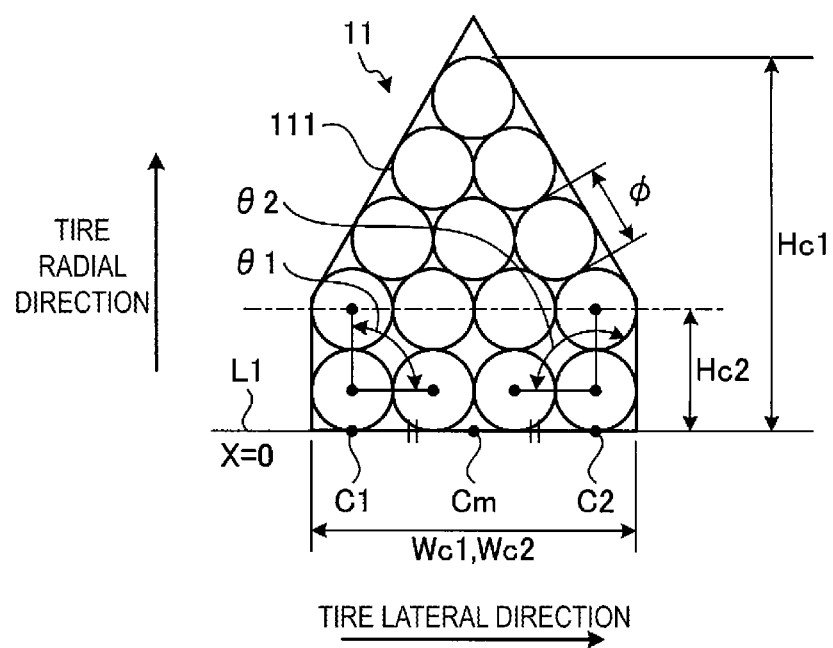
FIG. 12 is an explanatory diagram illustrating a modified example of the bead cores illustrated in FIG. 4.

In contrast, in the configuration of FIGS. 11 and 12, the number of layers of the wire cross sections is five, and the number of arrangements of the wire cross sections is set to 4-4-3-2-1 in the order from the innermost layer in the tire radial direction. Thus, the number of arrangements of the wire cross sections in the innermost layer is the same as the number of arrangements of the wire cross sections in the maximum arrangement layer. Additionally, in the configuration of FIG. 11, the arrangement angle θ1 of the wire cross sections at the corner portion inward in the tire radial direction and inward in the tire lateral direction of the wire arrangement structure has an acute angle, and is in the range from 55 degrees or greater to 65 degrees or less. On the other hand, the arrangement angle θ2 of the wire cross sections at the corner portion outward in the tire lateral direction has an obtuse angle and is in the range from 130 degrees or greater to 140 degrees or less. In the configuration illustrated in FIG. 12, both of the arrangement angles θ1, θ2 of the wire cross sections at the left and right corner portions inward in the tire radial direction of the wire arrangement structure have substantially right angles, and are in the range from 85 degrees or greater to 95 degrees or less. In this manner, at least the arrangement angle θ2 of the wire cross sections at the corner portion outward in the tire lateral direction preferably has the substantially right angle or obtuse angle. In the configuration illustrated in FIG. 12, the wire cross sections are arranged in a lattice shape inward from the maximum arrangement layers in the tire radial direction. In this manner, it is sufficient that the wire cross sections be arranged in the closely-packed structure at least in each layer outward from the maximum arrangement layers in the tire radial direction.

Gauge of Tire Side Portion

Figure 13:
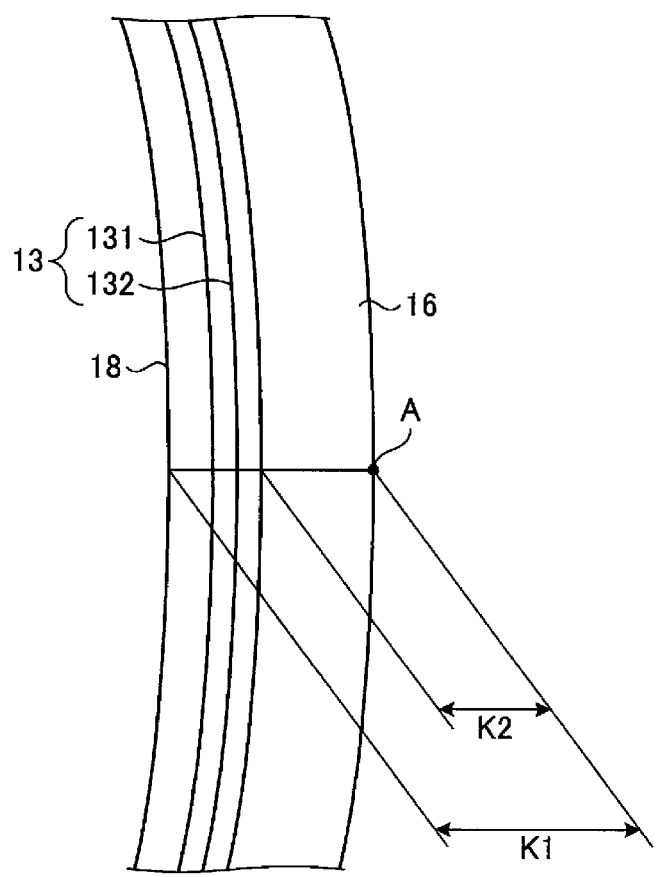
FIG. 13 is an enlarged view illustrating a tire side portion of the pneumatic tire illustrated in FIG. 1.

FIG. 13 is an enlarged view illustrating the tire side portion of the pneumatic tire illustrated in FIG. 1. The same drawing illustrates an enlarged cross-sectional view in the tire meridian direction at a tire maximum width position A.

In FIG. 13, a total thickness K1 of the tire side portion at the tire maximum width position A is preferably in the range $2.5 \text{ mm} \leq K1 \leq 6.5 \text{ mm}$, and more preferably in the range $3.0 \text{ mm} \leq K1 \leq 6.0 \text{ mm}$. Thus, the total thickness K1 of the tire side portion is made appropriate. That is, the lower limit ensures the total thickness K1 of the tire side portion, and ensures a tire rolling resistance. Also, the upper limit ensures the weight reduction of the tire.

The total thickness K1 of the tire side portion is measured as a distance in the tire lateral direction between the tire inner surface and the tire outer surface at the tire maximum width position A in the cross-sectional view in the tire meridian direction.

In addition, a thickness K2 of a sidewall rubber 16 at the tire maximum width position A is preferably in the range $0.3 \text{ mm} \leq K2 \leq 3.0 \text{ mm}$, and more preferably in the range $0.5 \text{ mm} \leq K2 \leq 2.5 \text{ mm}$. Thus, the thickness K2 of the sidewall rubber 16 is made appropriate. That is, the lower limit ensures the thickness K2 of the sidewall rubber 16 and ensures a cut resistance of the tire side portion. Also, the upper limit ensures the weight reduction of the tire.

Additionally, the thickness K2 of the sidewall rubber 16 at the tire maximum width position A and the tire gauge Wo outward of the carcass layer 13 in the tire lateral direction at the radial position twice the radial height H1 of the bead cores 11 preferably have the relationship $0.10 \leq K2/Wo \leq 3.00$, more preferably have the relationship $0.25 \leq K2/Wo \leq 2.50$, and further preferably have the relationship $0.35 \leq K2/Wo \leq 2.00$. Thus, the thickness K2 of the sidewall rubber 16 is made appropriate. That is, the lower limit ensures a cut resistance. Also, the upper limit ensures the weight reduction of the tire.

Overlap Between End Portion of Carcass Layer and Belt Layer

Figure 14:
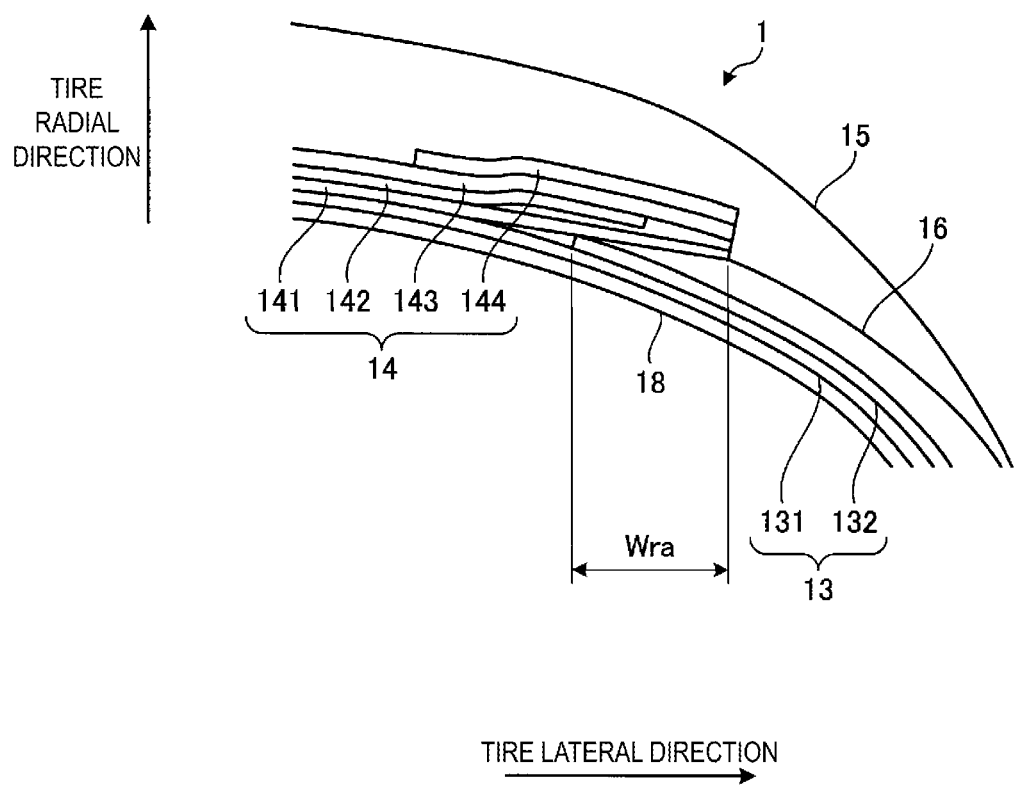
FIG. 14 is an enlarged view illustrating a shoulder portion of the pneumatic tire illustrated in FIG. 1.

FIG. 14 is an enlarged view illustrating a shoulder portion of the pneumatic tire illustrated in FIG. 1.

In the configuration of FIG. 1, as described above, the turned back portion 132 of the carcass layer 13 extends outward in the tire radial direction beyond the tire maximum width position A. Additionally, as illustrated in FIG. 14, the end portion (reference sign is omitted in the drawing) of the turned back portion 132 is held by being sandwiched between the body portion 131 of the carcass layer 13 and the innermost layer of the belt layer 14 (the cross belt 141 on the inner diameter side in FIG. 14). This increases tension of the carcass layer 13 and improves the rim fittability of the tire.

At this time, an overlapping width Wra between the turned back portion 132 of the carcass layer 13 and the innermost layer of the belt layer 14 in the tire lateral direction is preferably in the range $0 \text{ mm} \leq Wra \leq 30 \text{ mm}$, and more preferably in the range $5 \text{ mm} \leq Wra \leq 30 \text{ mm}$. Thus, the overlapping width Wra between the turned back portion 132 of the carcass layer 13 and the belt layer 14 is made appropriate. That is, the lower limit properly ensures the rim fittability of the tire, and the upper limit suppresses deterioration of uniformity of the tire.

Effects

As described above, the pneumatic tire 1 includes the bead cores 11, the carcass layer 13, and the rim cushion rubber 17. The bead cores 11 are formed by annularly and multiply winding one or a plurality of the bead wires 111. The carcass layer 13 is formed of the carcass ply of a single layer or a plurality of layers. The carcass layer 13 is turned back so as to wrap the bead cores 11 and extended between the bead cores 11. The rim cushion rubber 17 is disposed along the turned back portion 132 of the carcass layer 13 to constitute the rim fitting surface of the bead portion (see FIG. 1). The turned back portion 132 of the carcass layer 13 contacts the body portion 131 of the carcass layer 13 in the cross-sectional view in the tire meridian direction to form the closed region X surrounding the bead cores 11 (see FIG. 2). The rubber occupancy ratio in the closed region X is in the range of 15% or less. The bead cores 11 have the predetermined wire arrangement structure formed by arranging the wire cross sections of the bead wires 111 in the cross-sectional view in the tire meridian direction (see FIG. 4). Additionally, the self-contact height CH of the carcass layer 13 and the circumferential length L (dimension symbol is omitted in the drawing) of the wire arrangement structure have the relationship $1.0 \leq CH/L \leq 10.0$ (see FIG. 1).

In such a configuration, (1) the rubber occupancy ratio in the closed region X surrounded by the body portion 131 and the turned back portion 132 of the carcass layer 13, that is, the rubber volume around the bead cores 11, is set to be considerably low. This has an advantage that bead fillers are omitted and the weight of the tire is reduced. Additionally, (2) the ratio CH/L brings an advantage that the self-contact height CH of the carcass layer 13 is made appropriate. In other words, the lower limit causes the turned back portion 132 to stably contact the body portion 131, thus ensuring the rigidity of the bead portion and ensuring the rim fittability of the tire and the durability of the bead portion. In addition, the upper limit suppresses an increase in tire weight due to the excessive amount of the turned back portion 132. Note that since the amount of increase in the tire weight due to the amount of increase in the self-contact height CH is much smaller than the amount of reduction in the tire weight due to the omission of bead fillers described above, the weight reduction of the tire is appropriately achieved in the configuration described above as well.

Additionally, in the pneumatic tire 1 according to the embodiment of the present technology, the circumferential length L of the wire arrangement structure and the tire cross-sectional height SH (see FIG. 1) have the relationship $0.12 \le L/SH \le 1.00$. This has an advantage that the circumferential length L of the bead cores 11 is made appropriate. That is, the lower limit ensures the circumferential length L of the bead cores 11, and ensures the rim fittability of the tire. In addition, the upper limit suppresses the increase in tire weight due to the excessive amount of the bead cores 11.

Additionally, in the pneumatic tire 1 according to the embodiment of the technology, the tire cross-sectional height SH and the self-contact height CH of the carcass layer 13 have the relationship $2.4 \text{ mm} \le SH-CH \le 135 \text{ mm}$ (see FIG. 1). This has an advantage that the difference between the tire cross-sectional height SH and the self-contact height CH of the carcass layer 13 is made appropriate.

Additionally, in the pneumatic tire 1 according to the embodiment of the present technology, the self-contact height CH and the turned-up height PH (see FIG. 1) of the carcass layer 13 and the tire aspect ratio HF have the relationship $0.60 \times (HF/100) \le CH/PH \le 0.98$. This has the advantage that the ratio CH/PH is made appropriate. That is, the lower limit ensures the ratio of the self-contact height CH to the turned-up height PH of the carcass layer 13 and ensures the rim fittability of the tire. In addition, the upper limit suppresses an increase in tire weight due to the excessive amount of the turned back portion 132.

Additionally, in the pneumatic tire 1 according to the embodiment of the present technology, the tire gauge Wo outward in the tire lateral direction and the tire gauge Wi inward in the tire lateral direction of the carcass layer 13 at the radial positions twice the radial height H1 of the bead cores 11 have the relationship $3.0 \text{ mm} \le Wo+Wi \le 20 \text{ mm}$ (see FIG. 2). This has an advantage that the tire gauges inside and outside the carcass layer 13 in the region outward of the bead cores 11 in the radial direction are made appropriate. Specifically, the lower limit ensures the tire gauges in the region and ensures the rim fittability of the tire. In addition, the upper limit suppresses an increase in tire weight due to the excessive amount of the tire gauge.

Additionally, in the pneumatic tire 1 according to the embodiment of the present technology, the tire gauge Wo outward in the tire lateral direction and the tire gauge Wi inward in the tire lateral direction of the carcass layer 13 at the radial positions twice the radial height H1 of the bead cores 11 have the relationship $1.0 \le Wo/Wi \le 10.0$ (see FIG. 2). This has an advantage that the tire gauges inside and outside the carcass layer 13 in the region outward of the bead cores 11 in the radial direction are made appropriate. Therefore, the lower limit ensures the tire gauge Wo outward of the carcass layer 13 in the tire lateral direction and ensures the rim fittability of the tire. In addition, the upper limit suppresses an increase in tire weight due to the excessive amount of the tire gauge.

Additionally, in the pneumatic tire 1, the total thickness K1 of the tire side portion at the tire maximum width position A is in the range $2.5 \text{ mm} \le K1 \le 6.5 \text{ mm}$ (see FIG. 13). This has an advantage that the total thickness K1 of the tire side portion is made appropriate. That is, the lower limit ensures the total thickness K1 of the tire side portion, and ensures a tire rolling resistance. Also, the upper limit ensures the weight reduction of the tire.

In addition, in the pneumatic tire 1, the thickness K2 of the sidewall rubber 16 at the tire maximum width position A is in the range $0.3 \text{ mm} \le K2 \le 3.0 \text{ mm}$ (see FIG. 13). This has an advantage that the total thickness K2 of the sidewall rubber 16 is made appropriate. That is, the lower limit ensures the thickness K2 of the sidewall rubber 16 and ensures a cut resistance of the tire side portion. Also, the upper limit ensures the weight reduction of the tire.

Additionally, in the pneumatic tire 1, the thickness K2 (see FIG. 13) of the sidewall rubber 16 at the tire maximum width position A and the tire gauge Wo (see FIG. 2) outward of the carcass layer 13 in the tire lateral direction at the radial position twice the radial height H1 of the bead cores 11 have the relationship $0.10 \le K2/Wo \le 3.00$. Thus, the thickness K2 of the sidewall rubber 16 is made appropriate. That is, the lower limit ensures a cut resistance. Also, the upper limit ensures the weight reduction of the tire.

Additionally, in the pneumatic tire 1, the arrangement angle $\theta 2$ of the wire cross sections at the corner portion inward in the tire radial direction and outward in the tire lateral direction of the wire arrangement structure is in the range $80 \text{ degrees} \le \theta 2$. This has an advantage that disruption of the wire arrangement structure during tire vulcanization is suppressed, and the durability of the bead portion is improved.

Additionally, in the pneumatic tire 1 according to the embodiment of the present technology, the turned back portion 132 of the carcass layer 13 extends outward in the tire radial direction beyond the tire maximum width position A (see FIG. 1). This has an advantage that the tension of the carcass layer 13 is increased and the rim fittability of the tire is improved.

Additionally, the pneumatic tire 1 according to the embodiment of the present technology includes the belt layer 14 disposed outward of the carcass layer 13 in the tire radial direction (see FIG. 1). Additionally, the turned back portion 132 of the carcass layer 13 is disposed to be sandwiched between the carcass layer 13 and the innermost layer of the belt layer 14 (see FIG. 14). Additionally, the overlapping width Wra between the turned back portion 132 of the carcass layer 13 and the innermost layer of the belt layer 14 in the tire lateral direction is in the range $0 \text{ mm} < Wra \le 30 \text{ mm}$. This has an advantage that the overlapping width Wra between the turned back portion 132 of the carcass layer 13 and the belt layer 14 is made appropriate. That is, the lower limit properly ensures the rim fittability of the tire, and the upper limit suppresses deterioration of uniformity of the tire.

Additionally, in the pneumatic tire 1, the height Hc2 from the tangent line L1 to the maximum width position of the bead cores 11 and the maximum height Hc1 of the bead cores 11 have the relationship $1.10 \le (Hc1-Hc2)/Hc2 \le 2.80$ (see FIG. 4). This has an advantage that the wire arrangement structure of the bead cores 11 is made appropriate.

Additionally, in the pneumatic tire 1, the outer diameter $\varphi$ of the bead wire 111 (see FIG. 4) is in a range $0.8 \text{ mm} \le \varphi \le 1.5 \text{ mm}$. Thus, the outer diameter $\varphi$ of the bead wire 111 is made appropriate. That is, the lower limit ensures the outer diameter $\varphi$ of the bead wire 111, and ensures the rim fittability of the tire. In addition, the upper limit reduces the weight of the bead cores 11.

Additionally, in the pneumatic tire 1, a layer in which the number of arrangements of the wire cross sections is the maximum in the wire arrangement structure (in FIG. 4, the second layer from the innermost layer) is defined as the maximum arrangement layer. At this time, the number of layers of the wire cross sections outward in the tire radial direction with respect to the maximum arrangement layer (three layers in FIG. 4) is greater than the number of layers of the wire cross sections inward in the tire radial direction with respect to the maximum arrangement layer (one layer in FIG. 4). Additionally, the number of arrangements of the wire cross sections in each layer outward in the tire radial direction with respect to the maximum arrangement layer monotonically decreases outward in the tire radial direction from the maximum arrangement layer (see FIG. 4). This has an advantage that a gap between the joining portion of the body portion 131 with the turned back portion 132 of the carcass layer 13 and the top portion (so-called bead top) outward of the bead core 11 in the tire radial direction becomes small, and the durability of the bead portion is improved. In particular, the structure in which bead fillers are omitted described above is preferred in that the rubber occupancy ratio in the closed region X can be reduced. In addition, there is an advantage that, since the turned back portion 132 can bend at an obtuse angle at the joining position with the body portion 131, the amount of bending of the turned back portion 132 becomes small, and the durability of the bead portion is improved.

EXAMPLE

Figure 16:
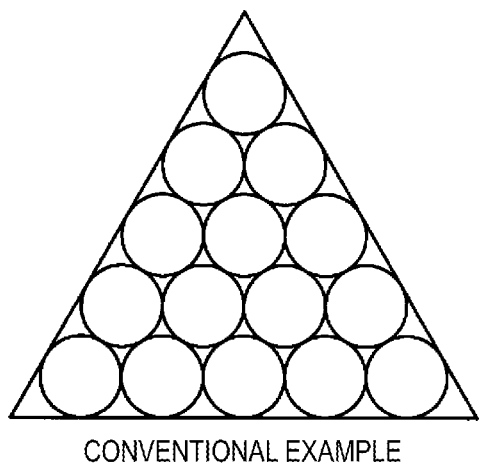
FIG. 16 is an explanatory diagram illustrating bead cores of a test tire of Conventional Example.

FIG. 15 is a table showing results of performance tests of pneumatic tires according to the embodiments of the present technology. FIG. 16 is an explanatory diagram illustrating bead cores of a test tire of Conventional Example.

In the performance test, a plurality of types of test tires having a tire size of 205/55R16 were evaluated for (1) tire mass and (2) rim fittability.

(1) The tire mass is calculated as the average value of the masses of five test tires having the same structure. The measurement results are expressed as index values and evaluated with the Conventional Example being assigned as the reference (100). The smaller the values in this evaluation, the lighter the test tires are, which is preferred. Additionally, when the index is 99 or less, it can be said that the weight of the tire is reduced compared to that of the existing tire structure including bead fillers.

(2) In the evaluation for rim fittability, the test tires are mounted on rims having a rim size of 16×6.5 J, and the test tires are inflated to an air pressure of 230 kPa and a load specified by JATMA is given. The test tires were mounted on a Sport Utility Vehicle (SUV) as a test vehicle with an engine displacement of 2000 cc. Then, the test vehicle performs a J-turn on a predetermined traveling path while the air pressures of the test tires are gradually decreased, and the air pressure at the time of air leakage is measured. The measurement results are expressed as index values and evaluated with the Conventional Example being assigned as the reference (100). In this evaluation, larger values are preferable.

The test tires of Examples 1 to 9 achieve the weight reduction of the tires by having the structures of omitting bead fillers (see FIGS. 1 and 2).

In the test tires of Conventional Example, the self-contact height CH of the carcass layer 13 is set to be small in the configuration of the test tire of Example 1.

As shown from the test results, it is seen that the test tires of Examples 1 to 9 can improve the rim fittability and the steering stability of the tire while the weights of the tires are reduced.

The invention claimed is:

1. A pneumatic tire, comprising:
   bead cores formed by annularly and multiply winding one or a plurality of bead wires;
   a carcass layer formed of a carcass ply of a single layer or a plurality of layers, the carcass layer being turned back so as to wrap the bead cores and extended between the bead cores;
   a rim cushion rubber disposed along a turned back portion of the carcass layer to constitute a rim fitting surface of a bead portion;
   the turned back portion of the carcass layer contacting a body portion of the carcass layer in a cross-sectional view in a tire meridian direction to form a closed region surrounding the bead cores;
   a rubber occupancy ratio in the closed region being in a range of 15% or less;
   the bead cores having a predetermined wire arrangement structure formed by arranging wire cross sections of the bead wires in the cross-sectional view in the tire meridian direction; and
   a self-contact height CH of the carcass layer and a circumferential length L of the wire arrangement structure have a relationship $1.0 \leq CH/L \leq 10.0$; wherein
   a total thickness K1 of a tire side portion at a tire maximum width position is in a range $2.5 \text{ mm} \leq K1 \leq 6.5 \text{ mm}$;
   the turned back portion of the carcass layer extends outward in a tire radial direction beyond a tire maximum width position;
   a rubber occupancy ratio is calculated as a ratio of a cross-sectional area of a rubber material around the bead core in the closed region to an overall cross-sectional area of the closed region, in the cross-sectional view in the tire meridian direction;
   a height Hc2 from a tangent line L1 to a maximum width position of the bead cores and a maximum height Hc1 of the bead cores have a relationship $1.30 \leq (Hc1-Hc2)/Hc2 \leq 2.80$; and
   a layer in which a number of arrangements of the wire cross sections is a maximum in the wire arrangement structure is defined as a maximum arrangement layer, and a number of layers of the wire cross sections in the overall wire arrangement structure is greater than a number of layers of the wire cross sections in the maximum arrangement layer;
   the following in the wire array structure are defined:
     a tangent line L1 that contacts, from a side of the rim fitting face, an innermost layer in a tire radial direction and innermost and outermost wire cross-sections in a tire lateral direction;
     contact points C1, C2 on the tangent line L1;
     a middle point Cm of the contact points C1, C2; and
     gauges G1, G2, and Gm in the tire radial direction from the contact points C1, C2 and the middle point Cm to the rim fitting face;
   change rates $\Delta G1$, $\Delta G2$, and $\Delta Gm$ of the gauges G1, G2, and Gm before and after rim assembly each are in a range of 10% to 60%;
   the change rates $\Delta G1$ and $\Delta G2$ satisfy a relationship $\Delta G2 < \Delta G1$;
   the gauges G1 and G2 before the rim assembly have a relationship $G2 < G1$;
   in a cross-sectional view in the tire meridian direction, a bead base of the rim fitting face has a shape formed by connecting two types of linear portions with different inclination angles to each other;

an extension line L2 of one of the linear portions on a side of a bead heel of the bead base and an extension line L3 of other of the linear portions on a side of a bead toe of the bead base are defined;

inclination angles α, β of the extension lines L2 and L3 of the bead base with respect to the tangent line L1 of the bead core have a relationship $1.8 \leq \beta/\alpha \leq 4.0$; and the inclination angle α of the extension line L2 of the bead base with respect to the tangent line L1 of the bead core is in a range of $3° \leq \alpha \leq 15°$.

2. The pneumatic tire according to claim 1, wherein the circumferential length L of the wire arrangement structure and a tire cross-sectional height SH have a relationship $0.12 \leq L/SH \leq 1.00$.

3. The pneumatic tire according to claim 1, wherein a tire cross-sectional height SH and the self-contact height CH of the carcass layer have a relationship $2.4 \text{ mm} \leq SH-CH \leq 135 \text{ mm}$.

4. The pneumatic tire according to claim 1, wherein the self-contact height CH and a turned-up height PH of the carcass layer and a tire aspect ratio HF have a relationship $0.60 \times (HF/100) \leq CH/PH \leq 0.98$.

5. The pneumatic tire according to claim 1, wherein a tire gauge Wo outward in a tire lateral direction and a tire gauge Wi inward in the tire lateral direction of the carcass layer at radial positions twice a radial height H1 of the bead cores have a relationship $3.0 \text{ mm} \leq Wo+Wi \leq 20 \text{ mm}$.

6. The pneumatic tire according to claim 1, wherein a tire gauge Wo outward in a tire lateral direction and a tire gauge Wi inward in the tire lateral direction of the carcass layer at radial positions twice a radial height H1 of the bead cores have a relationship $1.0 \leq Wo/Wi \leq 10.0$.

7. The pneumatic tire according to claim 1, wherein a thickness K2 of a sidewall rubber at a tire maximum width position is in the range $0.3 \text{ mm} \leq K2 \leq 3.0 \text{ mm}$.

8. The pneumatic tire according to claim 1, wherein a thickness K2 of a sidewall rubber at a tire maximum width position and a tire gauge Wo outward of the carcass layer in a tire lateral direction at a radial position twice a radial height H1 of the bead cores have a relationship $0.10 \leq K2/Wo \leq 3.00$.

9. The pneumatic tire according to claim 1, wherein an arrangement angle θ2 of the wire cross sections at a corner portion inward in a tire radial direction and outward in a tire lateral direction of the wire arrangement structure is in a range $80 \text{ degrees} \leq \theta2$.

10. The pneumatic tire according to claim 1, comprising a belt layer disposed outward of the carcass layer in a tire radial direction, wherein the turned back portion of the carcass layer is disposed to be sandwiched between the carcass layer and an innermost layer of the belt layer, and an overlapping width Wra between the turned back portion of the carcass layer and the innermost layer of the belt layer in a tire lateral direction is in a range $0 \text{ mm} < Wra \leq 30 \text{ mm}$.

11. The pneumatic tire according to claim 1, wherein an outer diameter φ of the bead wire is in a range $0.8 \text{ mm} \leq \varphi \leq 1.5 \text{ mm}$.

12. The pneumatic tire according to claim 1, wherein a number of layers of the wire cross sections outward in a tire radial direction with respect to the maximum arrangement layer is greater than a number of layers of the wire cross sections inward in the tire radial direction with respect to the maximum arrangement layer, and a number of arrangements of the wire cross sections in each layer outward in the tire radial direction with respect to the maximum arrangement layer monotonically decreases outward in the tire radial direction from the maximum arrangement layer.

13. The pneumatic tire according to claim 1, wherein a number of the plurality of bead wires forming an outer circumference of each bead core of the bead cores is 9, 10, 11 or 13.

14. A pneumatic tire, comprising:

bead cores formed by annularly and multiply winding one or a plurality of bead wires;

a carcass layer formed of a carcass ply of a single layer or a plurality of layers, the carcass layer being turned back so as to wrap the bead cores and extended between the bead cores;

a rim cushion rubber disposed along a turned back portion of the carcass layer to constitute a rim fitting surface of a bead portion;

the turned back portion of the carcass layer contacting a body portion of the carcass layer in a cross-sectional view in a tire meridian direction to form a closed region surrounding the bead cores;

a rubber occupancy ratio in the closed region being in a range of 15% or less;

the bead cores having a predetermined wire arrangement structure formed by arranging wire cross sections of the bead wires in the cross-sectional view in the tire meridian direction; and a self-contact height CH of the carcass layer and a circumferential length L of the wire arrangement structure have a relationship $1.0 \leq CH/L \leq 10.0$; wherein a total thickness K1 of a tire side portion at a tire maximum width position is in a range $2.5 \text{ mm} \leq K1 \leq 6.5 \text{ mm}$;

the turned back portion of the carcass layer extends outward in a tire radial direction beyond a tire maximum width position;

a rubber occupancy ratio is calculated as a ratio of a cross-sectional area of a rubber material around the bead core in the closed region to an overall cross-sectional area of the closed region, in the cross-sectional view in the tire meridian direction;

a layer in which a number of arrangements of the wire cross sections is a maximum in the wire arrangement structure is defined as a maximum arrangement layer;

a number of layers of the wire cross sections outward in a tire radial direction with respect to the maximum arrangement layer is greater than a number of layers of the wire cross sections inward in the tire radial direction with respect to the maximum arrangement layer;

a number of arrangements of the wire cross sections in each layer outward in the tire radial direction with respect to the maximum arrangement layer monotonically decreases outward in the tire radial direction from the maximum arrangement layer; a number of arrangements of the wire cross sections in an innermost layer in the tire radial direction in the wire arrangement structure is smaller than a number of arrangements of the wire cross sections in the maximum arrangement layer;

the following in the wire array structure are defined:

a tangent line L1 that contacts, from a side of the rim fitting face, an innermost layer in a tire radial direction and innermost and outermost wire cross-sections in a tire lateral direction;

contact points C1, C2 on the tangent line L1;
a middle point Cm of the contact points C1, C2; and
gauges G1, G2, and Gm in the tire radial direction from the contact points C1, C2 and the middle point Cm to the rim fitting face;
change rates ΔG1, ΔG2, and ΔGm of the gauges G1, G2, and Gm before and after rim assembly each are in a range of 10% to 60%;
the change rates ΔG1 and ΔG2 satisfy a relationship ΔG2<ΔG1;
the gauges G1 and G2 before the rim assembly have a relationship G2<G1;
in a cross-sectional view in the tire meridian direction, a bead base of the rim fitting face has a shape formed by connecting two types of linear portions with different inclination angles to each other;
an extension line L2 of one of the linear portions on a side of a bead heel of the bead base and an extension line L3 of other of the linear portions on a side of a bead toe of the bead base are defined;
inclination angles α, β of the extension lines L2 and L3 of the bead base with respect to the tangent line L1 of the bead core have a relationship $1.8 \leq \beta/\alpha \leq 4.0$; and
the inclination angle α of the extension line L2 of the bead base with respect to the tangent line L1 of the bead core is in a range of $3° \leq \alpha \leq 15°$.

15. The pneumatic tire according to claim 14, wherein an arrangement angle θ2 of the wire cross sections at a corner portion inward in a tire radial direction and outward in a tire lateral direction of the wire arrangement structure is in a range 100 degrees≤θ2.

16. A pneumatic tire, comprising:
bead cores formed by annularly and multiply winding one or a plurality of bead wires;
a carcass layer formed of a carcass ply of a single layer or a plurality of layers, the carcass layer being turned back so as to wrap the bead cores and extended between the bead cores;
a rim cushion rubber disposed along a turned back portion of the carcass layer to constitute a rim fitting surface of a bead portion;
the turned back portion of the carcass layer contacting a body portion of the carcass layer in a cross-sectional view in a tire meridian direction to form a closed region surrounding the bead cores, the turned back portion of the carcass layer terminating without overlapping a belt layer;
a rubber occupancy ratio in the closed region being in a range of 15% or less;
the bead cores having a predetermined wire arrangement structure formed by arranging wire cross sections of the bead wires in the cross-sectional view in the tire meridian direction; and
a self-contact height CH of the carcass layer and a circumferential length L of the wire arrangement structure have a relationship $1.0 \leq CH/L \leq 10.0$; wherein a total thickness K1 of a tire side portion at a tire maximum width position is in a range $2.5\ mm \leq K1 \leq 6.5\ mm$;
the turned back portion of the carcass layer extends outward in a tire radial direction beyond a tire maximum width position;
a rubber occupancy ratio is calculated as a ratio of a cross-sectional area of a rubber material around the bead core in the closed region to an overall cross-sectional area of the closed region, in the cross-sectional view in the tire meridian direction;
the following in the wire array structure are defined:
a tangent line L1 that contacts, from a side of the rim fitting face, an innermost layer in a tire radial direction and innermost and outermost wire cross-sections in a tire lateral direction;
contact points C1, C2 on the tangent line L1;
a middle point Cm of the contact points C1, C2; and
gauges G1, G2, and Gm in the tire radial direction from the contact points C1, C2 and the middle point Cm to the rim fitting face;
change rates ΔG1, ΔG2, and ΔGm of the gauges G1, G2, and Gm before and after rim assembly each are in a range of 10% to 60%;
the change rates ΔG1 and ΔG2 satisfy a relationship ΔG2<ΔG1;
the gauges G1 and G2 before the rim assembly have a relationship G2<G1;
in a cross-sectional view in the tire meridian direction, a bead base of the rim fitting face has a shape formed by connecting two types of linear portions with different inclination angles to each other;
an extension line L2 of one of the linear portions on a side of a bead heel of the bead base and an extension line L3 of other of the linear portions on a side of a bead toe of the bead base are defined;
inclination angles α, β of the extension lines L2 and L3 of the bead base with respect to the tangent line L1 of the bead core have a relationship $1.8 \leq \beta/\alpha \leq 4.0$; and
the inclination angle α of the extension line L2 of the bead base with respect to the tangent line L1 of the bead core is in a range of $3° \leq \alpha \leq 15°$.

* * * * *